United States Patent
Peng et al.

(10) Patent No.: US 10,036,523 B2
(45) Date of Patent: Jul. 31, 2018

(54) LIGHT EMITTING MODULE WITH LENS

(71) Applicant: Taiwan Network Computer & Electronic Co., Ltd., New Taipei (TW)

(72) Inventors: Chia-Mei Peng, Ping-Chen (TW); Hsieh-Chen Chuang, New Taipei (TW); Ping-Han Chuang, New Taipei (TW)

(73) Assignee: TAIWAN NETWORK COMPUTER & ELECTRONIC CO., LTD., New Taipei (TW)

( * ) Notice: Subject to any disclaimer, the term of this patent is extended or adjusted under 35 U.S.C. 154(b) by 389 days.

(21) Appl. No.: 14/822,849

(22) Filed: Aug. 10, 2015

(65) Prior Publication Data
US 2017/0045192 A1  Feb. 16, 2017

(51) Int. Cl.
| | |
|---|---|
| B60Q 1/06 | (2006.01) |
| F21S 41/20 | (2018.01) |
| F21S 41/29 | (2018.01) |
| F21S 41/692 | (2018.01) |
| F21S 41/47 | (2018.01) |
| F21S 41/30 | (2018.01) |
| B60Q 1/14 | (2006.01) |
| F21S 41/255 | (2018.01) |
| F21S 41/265 | (2018.01) |
| F21S 41/275 | (2018.01) |
| F21S 41/32 | (2018.01) |
| F21S 41/43 | (2018.01) |
| F21S 41/63 | (2018.01) |
| F21S 41/141 | (2018.01) |
| F21S 41/162 | (2018.01) |

(52) U.S. Cl.
CPC .......... F21S 41/285 (2018.01); B60Q 1/1438 (2013.01); F21S 41/255 (2018.01); F21S 41/265 (2018.01); F21S 41/275 (2018.01); F21S 41/29 (2018.01); F21S 41/295 (2018.01); F21S 41/30 (2018.01); F21S 41/32 (2018.01); F21S 41/43 (2018.01); F21S 41/47 (2018.01); F21S 41/635 (2018.01); F21S 41/692 (2018.01); F21S 41/141 (2018.01); F21S 41/162 (2018.01)

(58) Field of Classification Search
CPC .......... B60Q 1/2696; B60Q 1/18; B60Q 1/28; B60Q 2300/056; F21S 48/1216; F21S 48/125; F21S 48/1258; F21S 48/1283
USPC ....................................... 362/522
See application file for complete search history.

(56) References Cited

U.S. PATENT DOCUMENTS

2013/0021812 A1 *  1/2013  Schug ................ F21S 48/1154
362/487

* cited by examiner

*Primary Examiner* — William Carter
(74) *Attorney, Agent, or Firm* — Guice Patents PLLC

(57) ABSTRACT

A light emitting module includes a reflector, a lens and a light source disposed in the reflector. The lens is disposed in front of the reflector to refract light forwards so that the illuminating area of the light emitting module is adjustable. The light emitting module is particularly suitable for head light of vehicles. The light emitting module has a high illuminating efficiency and prevent light from dazzling a driver's eyes.

30 Claims, 20 Drawing Sheets

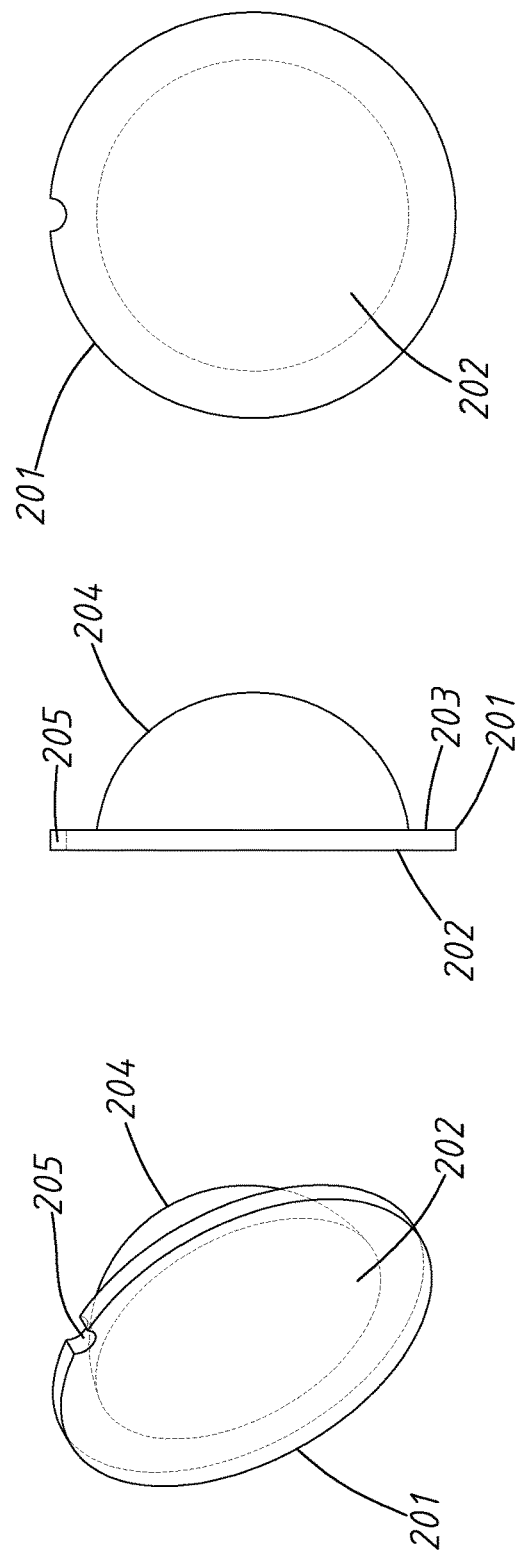

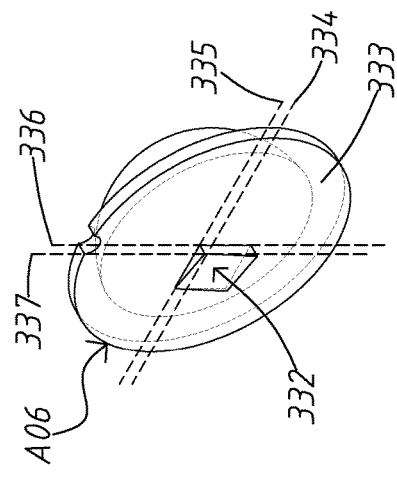
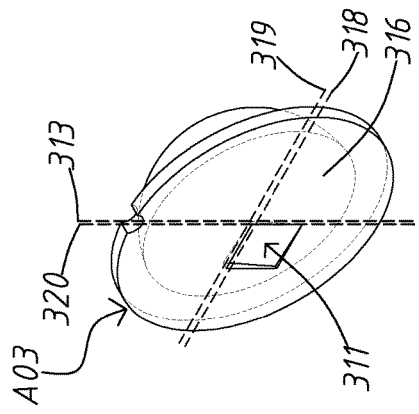
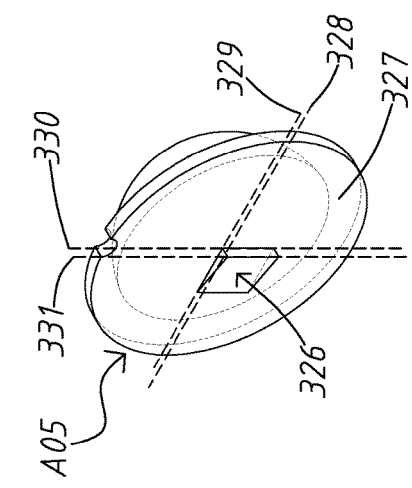
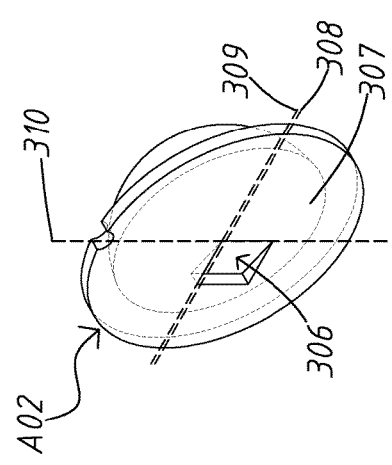
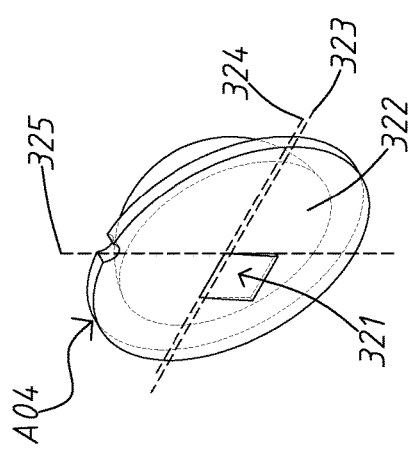
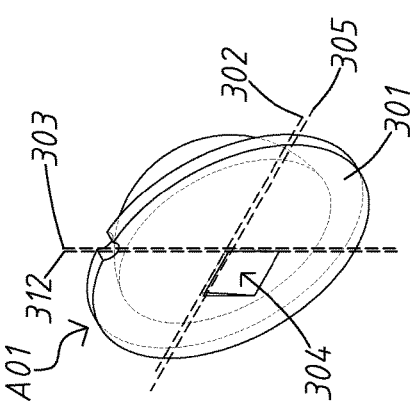
FIG. 3F  FIG. 3C
FIG. 3E  FIG. 3B
FIG. 3D  FIG. 3A

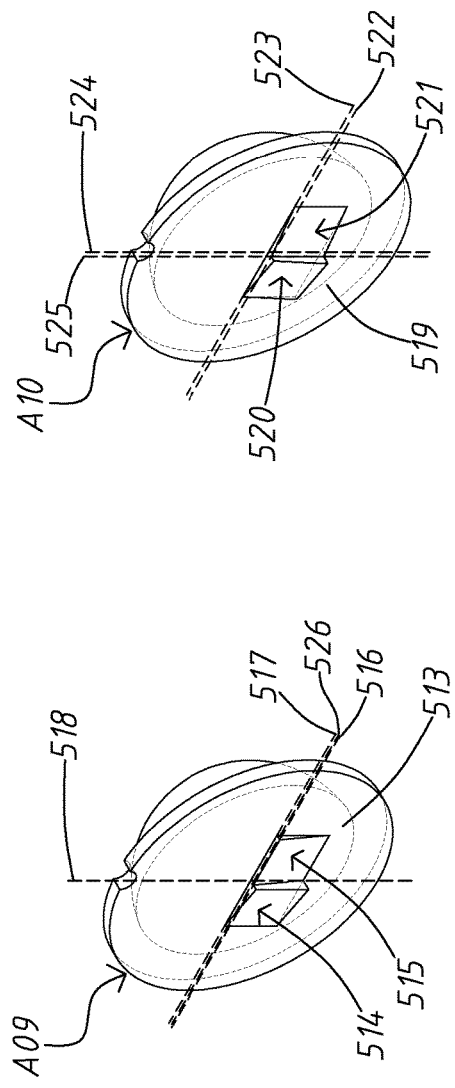
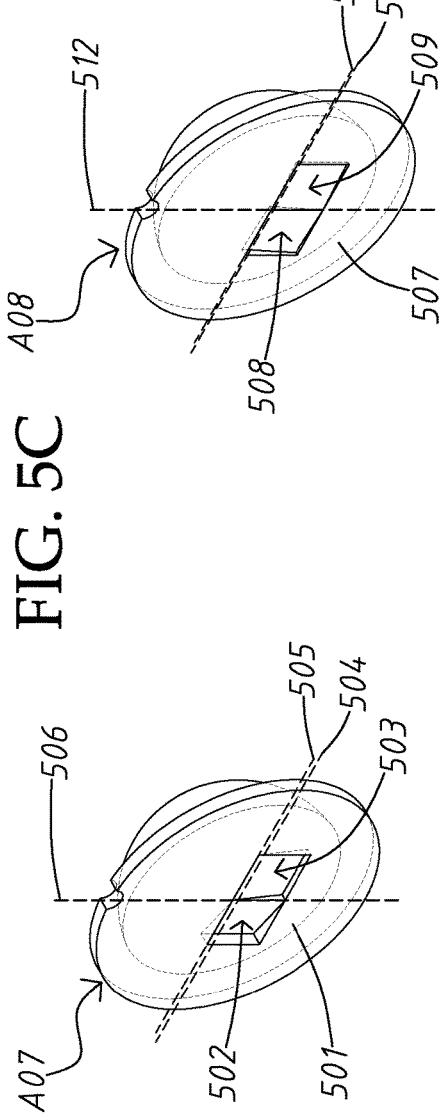
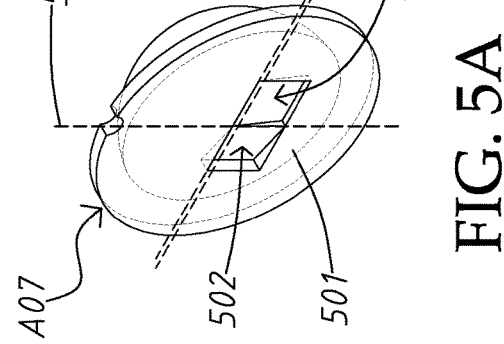

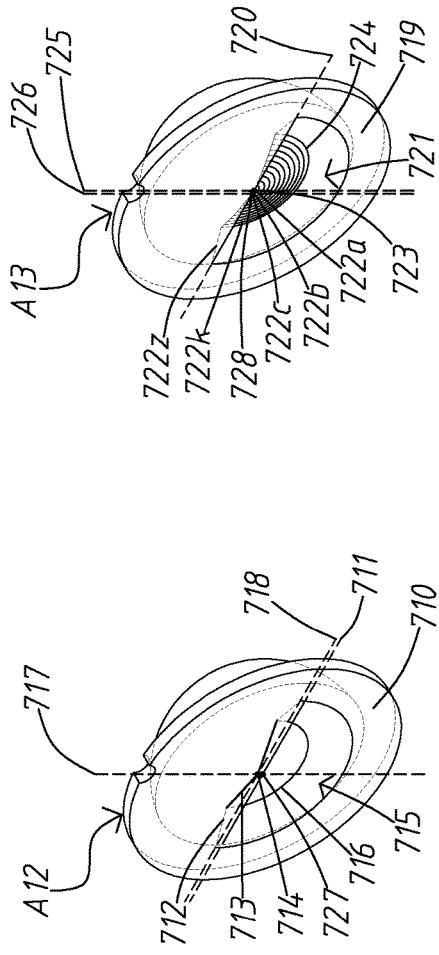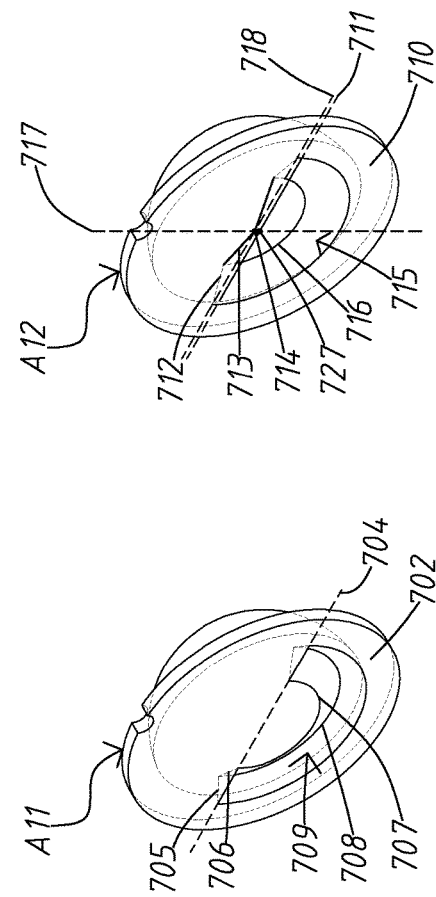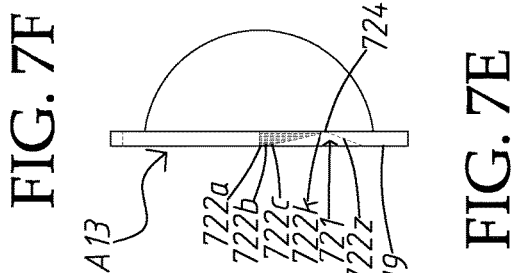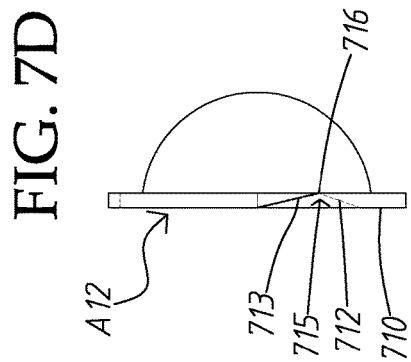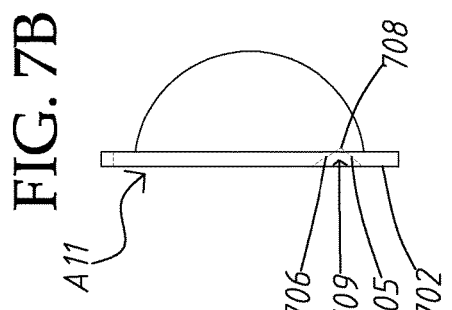

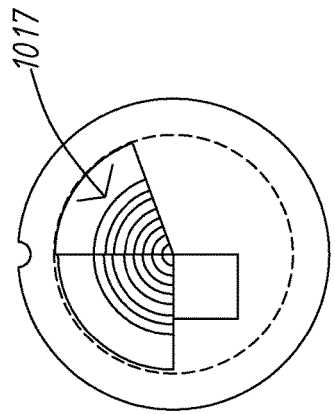
FIG. 10F
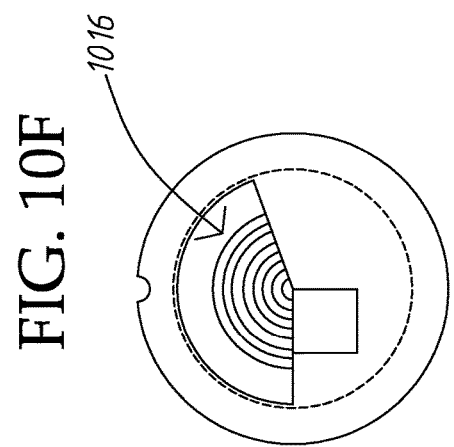
FIG. 10C
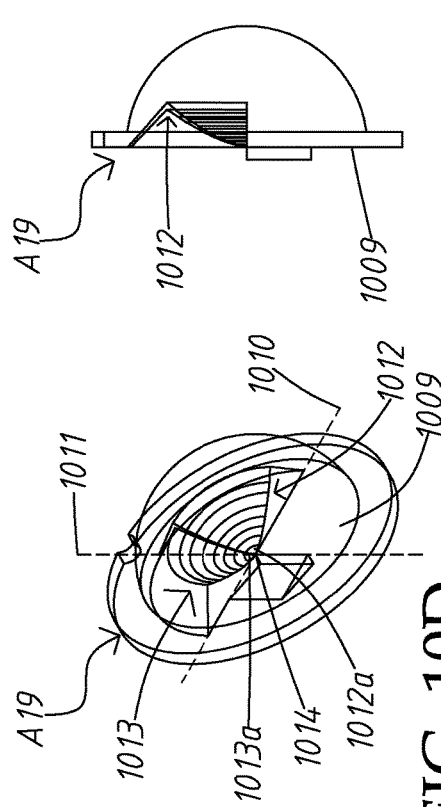
FIG. 10E
FIG. 10B
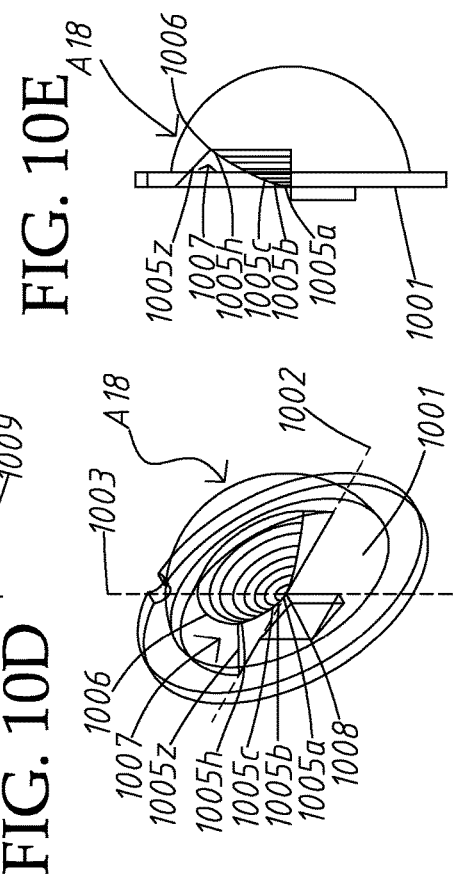
FIG. 10D
FIG. 10A

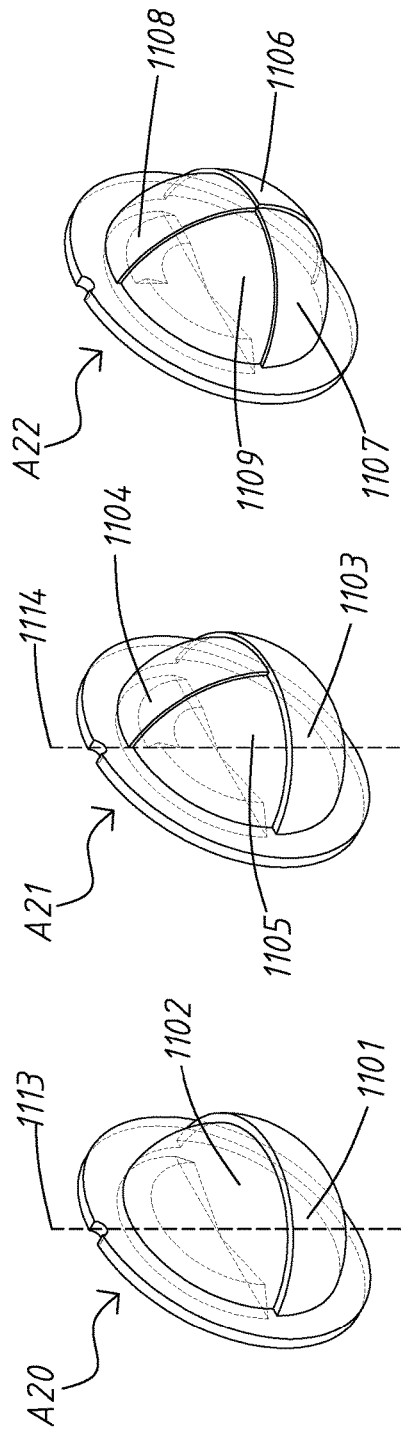
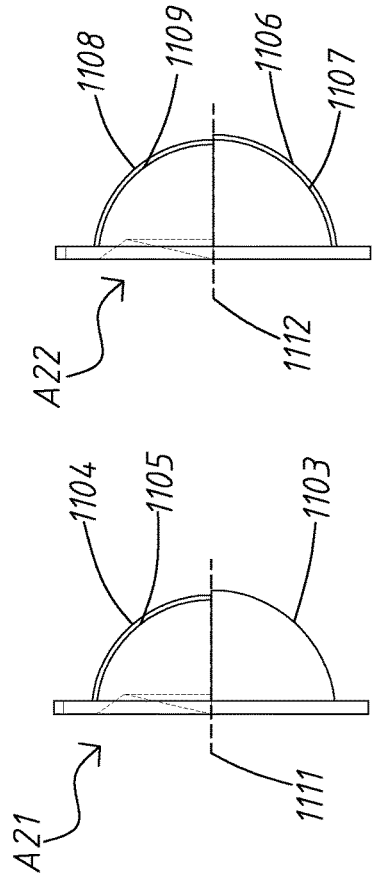
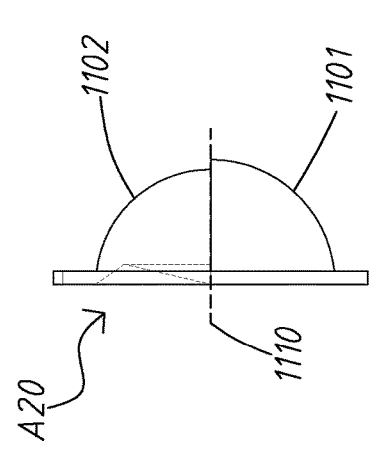
FIG. 11A  FIG. 11B  FIG. 11C  FIG. 11D  FIG. 11E  FIG. 11F

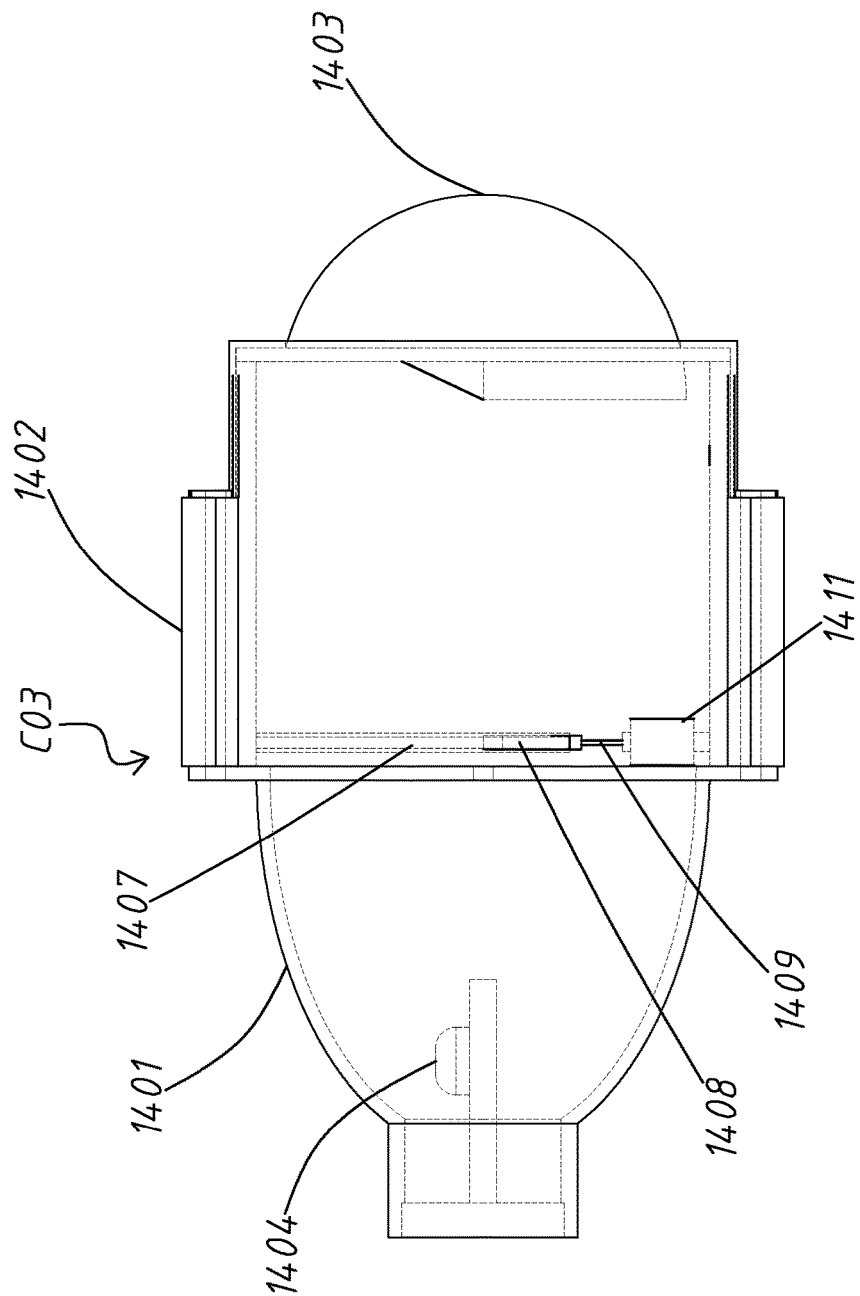

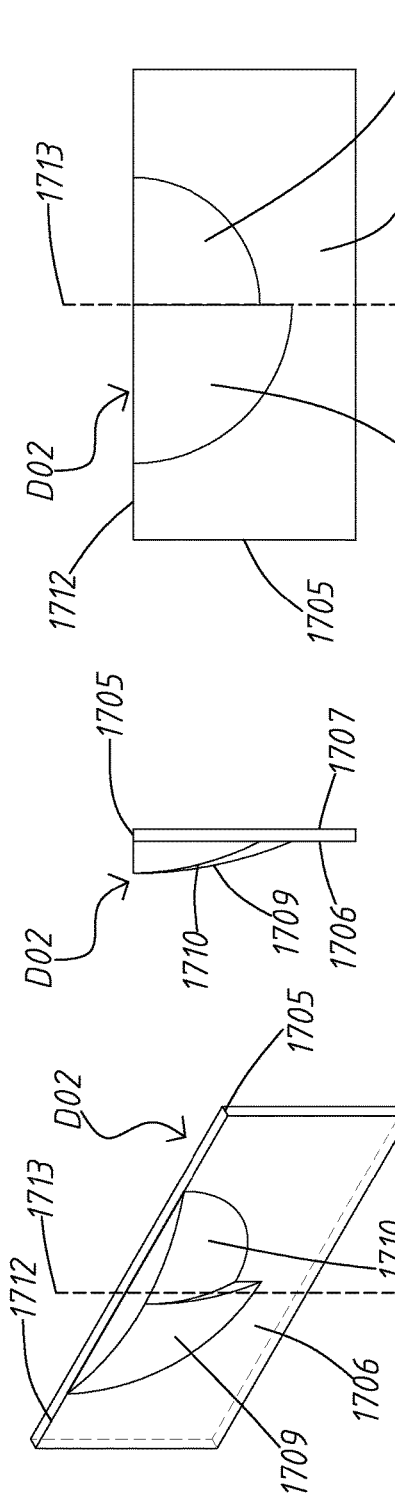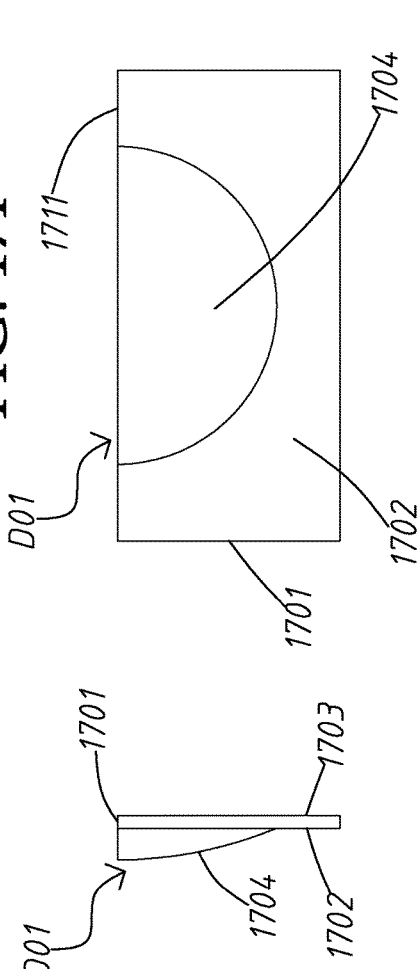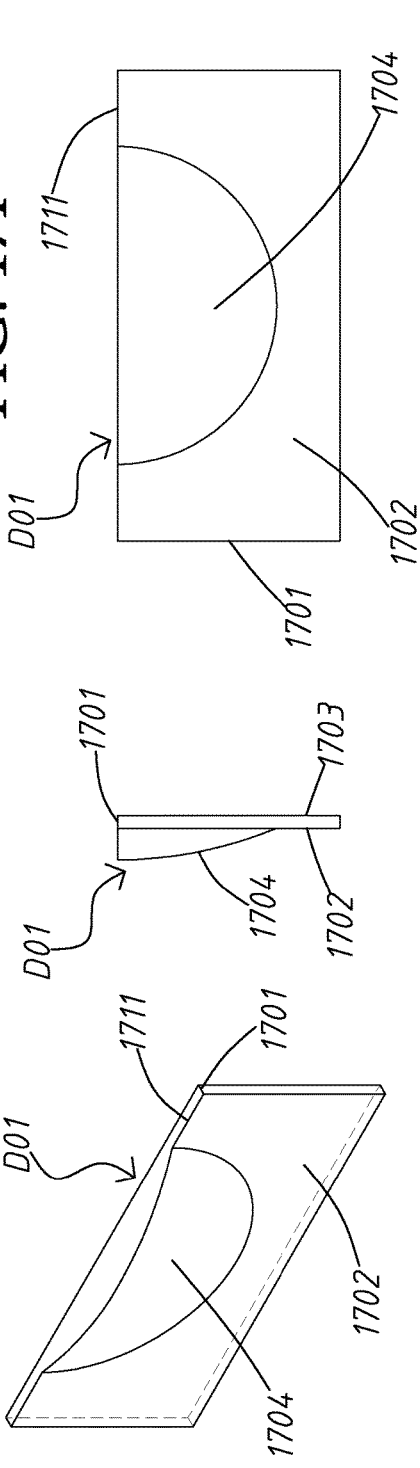

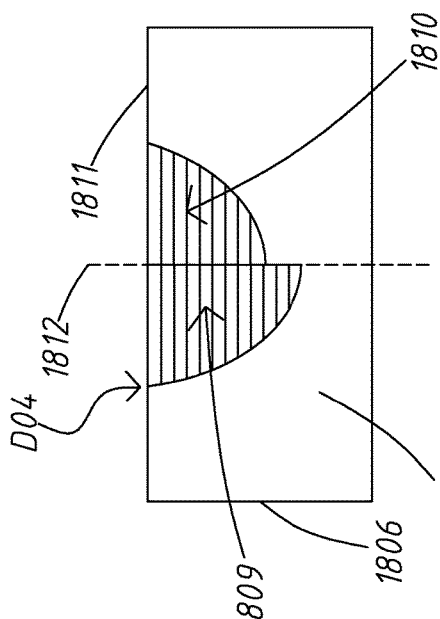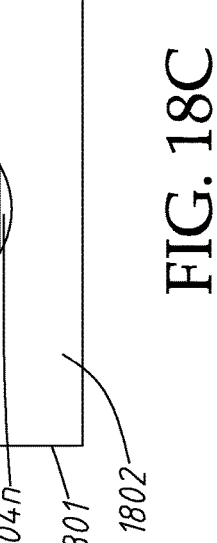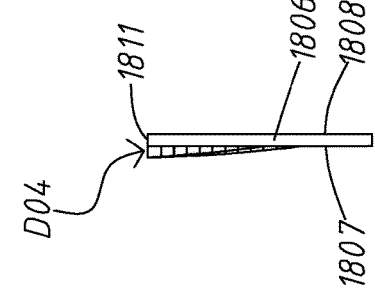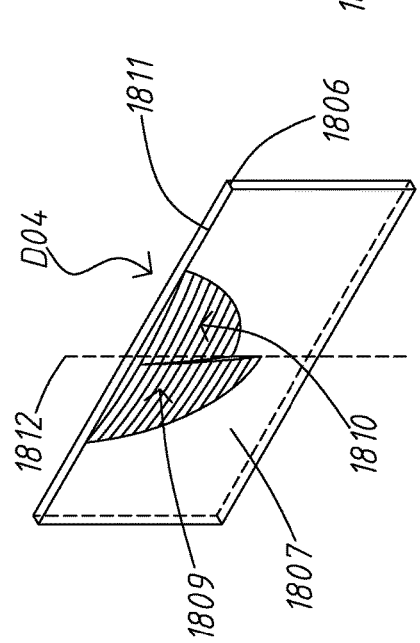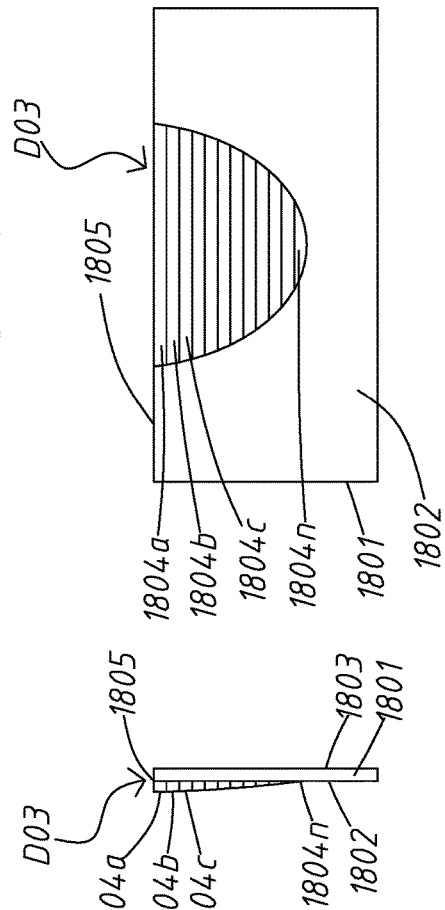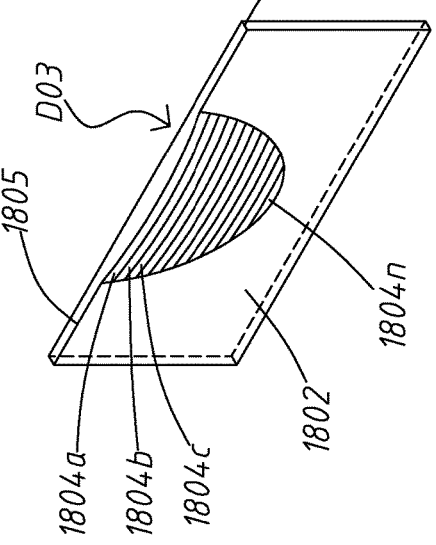

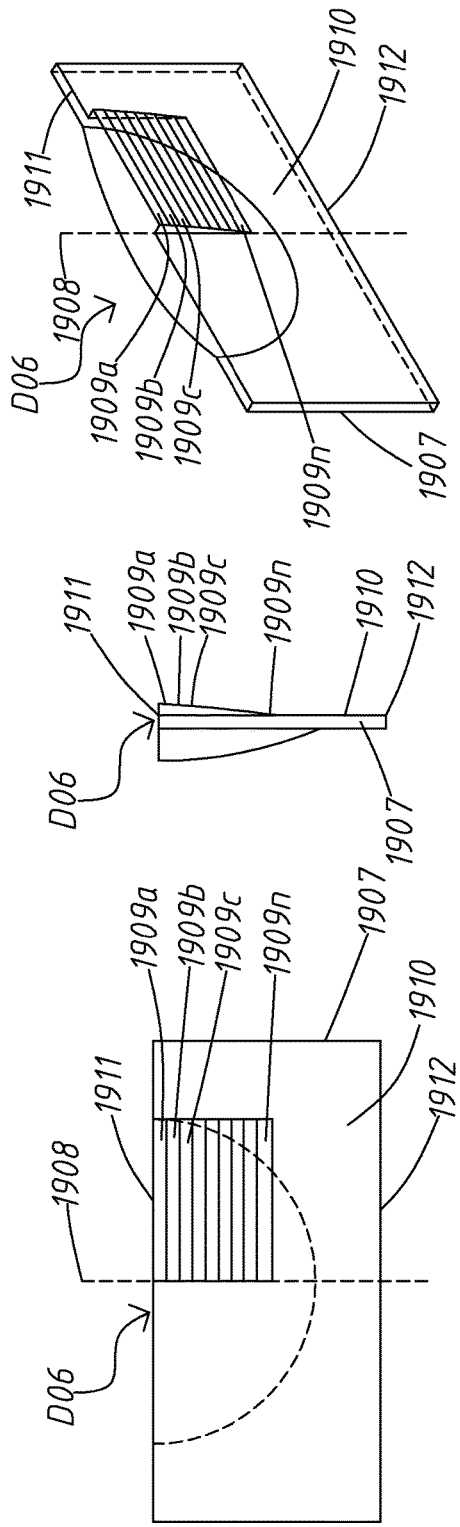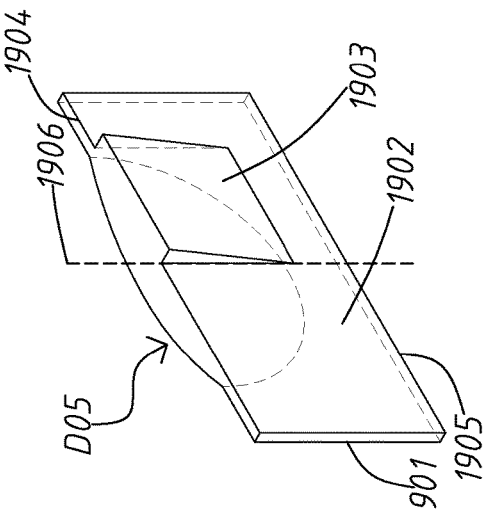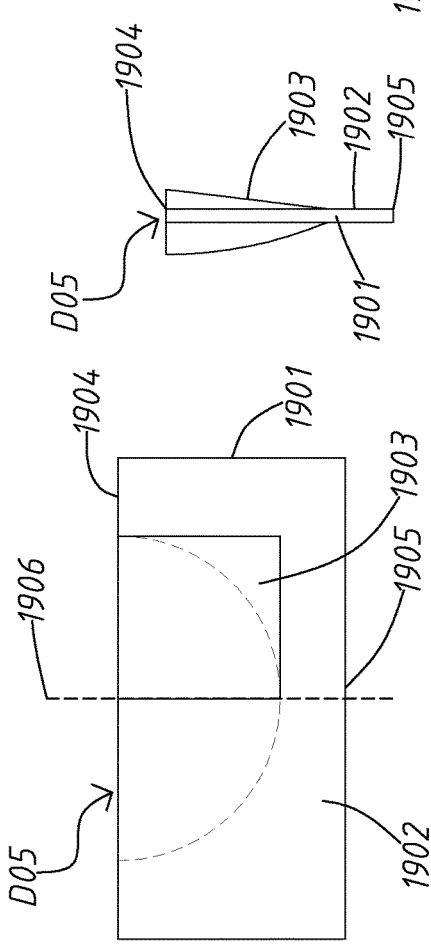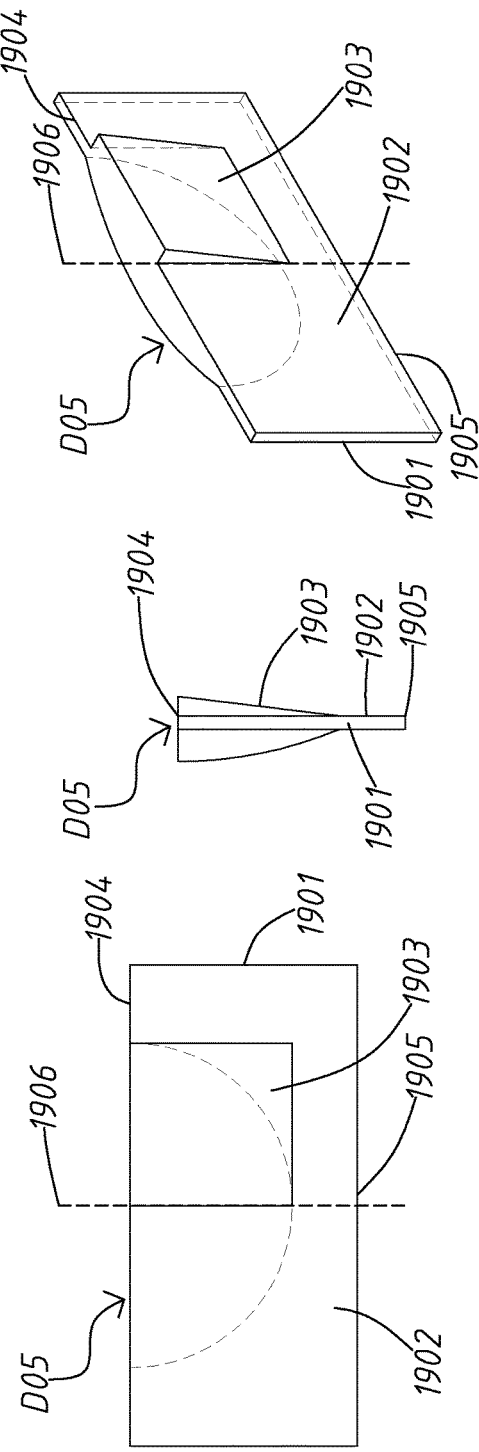

LIGHT EMITTING MODULE WITH LENS

BACKGROUND OF THE INVENTION

Field of the Invention

The invention relates to a light emitting module equipped with a lens, and more particularly to a light emitting module suitable for head light of vehicles and having an adjustable illuminating area where all light is emitted to.

Description of the Related Art

Referring to FIG. 1, a structure and an optical path of a conventional light emitting module is depicted. A light emitting module B01 includes a reflector 001. A light source 002 is disposed on a top of the reflector 001, and one end of a hollow frame 012 is mounted to a bottom of the reflector 001. A convex lens 003 is disposed on another end of the hollow frame 012. A light shielding plate 007 is disposed at an edge of the bottom of the reflector 001. An electromagnet 006 is connected to the light shielding plate 007 to control an angle of the light shielding plate 007 so as to change high beam illumination and low beam illumination. The light emitting module B01 is considered to prevent light from a coming vehicle from dazzling a driver's eyes.

However, such a head light with lens often dazzles a driver's eyes so as to influence traffic safety.

Referring to FIG. 1, when the light source 002 disposed in the light emitting module B01 emits light, the light is reflected by the reflector 001 to enter a bottom plane 004 of the convex lens 003 and finally exit the convex lens 003 from a convex arced surface 003. A portion of the light 008 is refracted downwards to under a horizontal line by the convex lens 003 and becomes light 011, and another light 009 is refracted by the convex lens 003 to above the horizontal line and becomes light 010. The light 010 above a transverse central line 013 and the light 011 under the transverse central line are symmetrical. That is at the larger angle the light 011 is refracted, the light 010 is refracted at the larger angle. The light emitting module B01 is named bi-lens lamp. When the lamp is switched to its low beam illumination, the electromagnet 006 controls the light shielding plate 007 to be positioned at a high elevation angle, whereby the light 009 reflected by the reflector 001 is shielded by the light shielding plate 007, and only the light 008 passes the convex lens 003 and is refracted to under the horizontal line. When the lamp is switched to its high beam illumination, the electromagnet controls the light shielding plate 007 to be positioned at a low elevation angle, whereby all light travels forwards. The light shielding plate causes only one half portion of the light to emit at the low beam illumination, and the light emitting to above the horizontal line may dazzle driver's eyes at the high beam illumination.

BRIEF SUMMARY OF THE INVENTION

An object of the invention is to provide a light emitting module including lens to prevent light dazzling a driver's eyes.

Another object of the invention is to provide a light emitting module including lens to adjust a range of an illuminating area.

Another object of the invention is to provide a light emitting module including lens to improve an illuminating efficiency of a lamp.

The invention provides a light emitting module. The light emitting module in accordance with an exemplary embodiment of the invention includes at least one light source; at least one reflector in which the light source is disposed having an inner surface serving as a reflecting surface; a hollow frame having an end disposed on a bottom of the reflector; and a lens disposed on another end of the hollow frame and including a transparent plate including two planes and a positioning structure on a periphery thereof and a convex arced surface serving as a light exiting surface and at least one inclined surface disposed on the transparent plate, one of the planes defining a top portion on which the convex arced surface is disposed, and the other of the planes defining a bottom portion serving as a light incident surface, wherein the lens has at least one vertical central line and a transversely extending line, the inclined surface is disposed on the bottom portion and located on one side of the vertical central line and on one side of the transversely extending line, the inclined surface refracts light at an angle different from an angle at which the planes refract light, and the lens refracts light reflected by the reflector.

In another exemplary embodiment, the vertical central line includes a first vertical central line on the bottom portion and a second vertical central line positioned in front of or behind the first vertical central line; the transversely extending line includes a first transversely extending line on the bottom portion and a second transversely extending line in front of, behind, above or under the first transversely extending line.

In yet another exemplary embodiment, the lens includes at least two convex arced surfaces, one of the convex arced surfaces has a radius different form a radius of the other of the convex arced surfaces.

In another exemplary embodiment, the lens further includes an inclined surface disposed on the bottom portion and located on one side of the vertical central line and under the transversely extending line; the inclined surface is a smooth inclined surface, extends from a top located on the transversely extending line to the bottom portion, and the closer a position on the inclined surface is located to the bottom portion, and the further the position is the away from the top portion.

In yet another exemplary embodiment, the lens further includes a plurality of inclined surfaces connected to each other and disposed on the bottom portion and located on one side of the vertical central line and under the transversely extending line, each of the inclined surfaces is a smooth inclined surface and has an inclined angle different the inclined angles of others of the inclined surfaces, and the closer the inclined surface is located to the bottom portion, the further the inclined surface is away from the top portion.

In another exemplary embodiment, the lens further includes an inclined surface disposed on the bottom portion and located on one side of the vertical central line and under the transversely extending line; the inclined surface is a smooth inclined surface and extends from a top located on the transversely extending line to the bottom portion, and the closer a position on the inclined surface is located to the bottom portion, the closer is the position located to the top portion.

In yet another exemplary embodiment, the lens further includes a plurality of inclined surfaces connected to each other and disposed on the bottom portion and located on one side of the vertical central line and under the transversely extending line, each of the inclined surfaces is a smooth inclined surface and has an inclined angle different the inclined angles of others of the inclined surfaces, and the closer the inclined surface is located to the bottom portion, the closer the inclined surface is located to the top portion.

In another exemplary embodiment, the lens further includes an inclined surface disposed on the bottom portion and located on one side of the vertical central line and under the transversely extending line; the inclined surface is a smooth inclined surface, has a lateral side located on the vertical central line and extends from the lateral side toward another lateral side, and the closer a position on the inclined surface is located to the another lateral side, the closer the position is located to the top portion.

In yet another exemplary embodiment, the lens further includes an inclined surface disposed on the bottom portion and located on one side of the vertical central line and under the transversely extending line; the inclined surface is a smooth inclined surface, has a lateral side located on the vertical central line and extends from the lateral side toward another lateral side, and the closer the inclined surface is located to the another lateral side, the closer the position is located to the top portion.

In another exemplary embodiment, the lens further includes an inclined surface disposed on the bottom portion and located on one side of the vertical central line and under the transversely extending line; the inclined surface is a smooth inclined surface and includes a top located on the transversely extending line and a lateral side located on the vertical central line, the inclined surface has two inclined directions, one of the inclined direction is from the top to the bottom portion, and the other of the inclined directions is from the lateral side to another lateral side of the inclined surface, the closer a position on the inclined surface is located to the bottom portion, the further the position is away from the top portion, and the closer a position on the inclined surface is located to the another lateral side, the closer the position is located to the top portion.

In yet another exemplary embodiment, the lens further includes at least two inclined surfaces which are arced inclined surfaces disposed on the bottom portion and under the transversely extending line; one of the arced inclined surfaces extends from a semi-circular arc located on a lower half portion of the bottom portion to a transition line and gradually towards the top portion, and the other of the arced inclined surfaces extends from the transition line away from the top portion.

In another exemplary embodiment, the lens further includes at least two inclined surfaces which are arced inclined surfaces disposed on the bottom portion and under the transversely extending line; one of the arced inclined surfaces extends from an intersecting point of the vertical central line and a transversely extending line to a transition line and gradually towards the top portion, and the other of the arced inclined surfaces extends from the transition line away from the top portion.

In yet another exemplary embodiment, the lens further includes at least four inclined surfaces which are arced inclined surfaces disposed on the bottom portion and under the transversely extending line; one of the arced inclined surfaces extends from an intersecting point of the vertical central line and a transversely extending line to a transition line and gradually towards the top portion, and another of the arced inclined surfaces extends from the transition line away from the top portion; another of the arced inclined surfaces extends from a point on the vertical central line and above the intersecting point to another transition line and gradually towards the top portion, and another of the arced inclined surfaces extends from the transition line away from the top portion.

In another exemplary embodiment, the lens further includes two curved surfaces and two arced inclined surfaces disposed on the bottom portion and under the transversely extending line, and each of the curved surface includes a plurality of arced inclined surfaces connected to each other and each of the arced inclined surfaces has an inclined angle different from the inclined angle of other arced inclined surfaces; each of the curved surface extends from an intersecting point of the vertical central line and the transversely extending line to a transition line and gradually towards the top portion; each of the arced inclined surface extends from the transition line away from the top portion.

In yet another exemplary embodiment, the lens further includes two curved surfaces and two arced inclined surfaces disposed on the bottom portion and under the transversely extending line, and each of the curved surface includes a plurality of arced inclined surfaces connected to each other and each of the arced inclined surfaces has an inclined angle different from the inclined angle of other arced inclined surfaces; one of the curved surfaces extends from an intersecting point of the vertical central line and the transversely extending line to a transition line and gradually towards the top portion, one of the arced inclined surface extends from the transition line away from the top portion; the other of the curved surfaces extends from a point on the vertical central line to another transition line and gradually towards the top portion, and the other of the arced inclined surface extends from the another transition line away from the top portion.

In another exemplary embodiment, the lens further includes a curved surface and an arced inclined surfaces disposed on the bottom portion and under the transversely extending line, and each of the curved surface includes a plurality of arced inclined surfaces connected to each other and each of the arced inclined surfaces has an inclined angle different from the inclined angle of other arced inclined surfaces; the curved surface extends from an intersecting point of the vertical central line and the transversely extending line to a transition line and gradually towards the top portion, and the arced inclined surface extends from the transition line away from the top portion.

In yet another exemplary embodiment, the lens further includes at least two inclined surfaces which are arced inclined surfaces disposed on the bottom portion and above the transversely extending line; one of the arced inclined surfaces extends from an intersecting point of the vertical central line and a transversely extending line to a transition line and gradually towards the top portion, and the other of the arced inclined surfaces extends from the transition line away from the top portion.

In another exemplary embodiment, the lens further includes at least four inclined surfaces which are arced inclined surfaces disposed on the bottom portion and above the transversely extending line; one of the arced inclined surfaces extends from an intersecting point of the vertical central line and a transversely extending line to a transition line and gradually towards the top portion, and another of the arced inclined surfaces extends from the transition line away from the top portion; another of the arced inclined surfaces extends from a point on the vertical central line and above the intersecting point to another transition line and gradually towards the top portion, and another of the arced inclined surfaces extends from the transition line away from the top portion.

In yet another exemplary embodiment, the lens further includes at least two inclined surfaces which are arced inclined surfaces disposed on the bottom portion and above the transversely extending line; one of the arced inclined surfaces extends from an intersecting point of the vertical central line and a transversely extending line to a transition line and gradually towards the top portion, and the other of the arced inclined surfaces extends from the transition line away from the top portion.

In another exemplary embodiment, the lens further includes two curved surfaces and two arced inclined surfaces disposed on the bottom portion and above the transversely extending line, and each of the curved surface includes a plurality of arced inclined surfaces connected to each other and each of the arced inclined surfaces has an inclined angle different from the inclined angle of other arced inclined surfaces; one of the curved surfaces extends from an intersecting point of the vertical central line and the transversely extending line to a transition line and gradually towards the top portion, one of the arced inclined surface extends from the transition line away from the top portion; the other of the curved surfaces extends from a point on the vertical central line to another transition line and gradually towards the top portion, and the other of the arced inclined surface extends from the another transition line away from the top portion.

In yet another exemplary embodiment, the lens further includes a curved surface and an arced inclined surfaces disposed on the bottom portion and under the transversely extending line, and each of the curved surface includes a plurality of arced inclined surfaces connected to each other and each of the arced inclined surfaces has an inclined angle different from the inclined angle of other arced inclined surfaces; the curved surface extends from an intersecting point of the vertical central line and the transversely extending line to a transition line and gradually towards the top portion, and the arced inclined surface extends from the transition line away from the top portion.

In another exemplary embodiment, the light emitting module further includes at least one conical panel and at least one waring light emitting module.

In yet another exemplary embodiment, the light emitting module further includes at least one light shielding plate disposed on a bottom of the reflector.

In another exemplary embodiment, the hollow frame includes at least one positioning structure and a light shielding plate disposed on the positioning plate and connected to at least one retractable rod of an electromagnet.

In yet another exemplary embodiment, the hollow frame includes at least one positioning structure and a light grating movably disposed on the positioning structure and connected to at least one retractable rod of an electromagnet.

In another exemplary embodiment, the light grating includes a transparent plate having a top surface and a bottom surface, at least one arced surface is formed on a central region of the bottom surface, and the arced surface has a highest point located on a position above a center of the bottom surface.

In yet another exemplary embodiment, the light grating further includes at least one inclined surface disposed on one side of a vertical central line of the top surface, the inclined surface is a smooth inclined surface, the inclined surface extends from a top of the light grating to a bottom of the light grating and gradually towards the top portion.

In another exemplary embodiment, the light grating includes a transparent plate having a top surface and a bottom surface, a plurality of inclined surfaces connected to each other are formed on a central region of the bottom surface, the closer the inclined surface is located to a bottom of the light grating, the more the inclined surface inclined towards the bottom surface.

In yet another exemplary embodiment, the light grating further includes at least one inclined surface disposed on one side of a vertical central line of the top surface, the inclined surface is a smooth inclined surface, the inclined surface extends from a top of the light grating to a bottom of the light grating and gradually towards the top portion.

In another exemplary embodiment, the hollow frame further includes at least another positioning structure and a light shielding plate movably disposed on the positioning structure; the light shielding plate has one side connected to one end of a first frame, another end of the first frame and one end of a second frame are joined to a movable shaft, the second frame has a central portion mounted to a movable shaft of another positioning structure disposed on the hollow frame, and another end of the second frame is connected to a movable shaft disposed on a retractable rod of an electromagnet.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A is a perspective view of a lens structure of the invention;

FIG. 2B is a side view of a lens structure of the invention;

FIG. 2C is a bottom view of a lens structure of the invention;

FIG. 3A is a perspective view of the first embodiment of a lens of the invention;

FIG. 3B is a perspective view of the second embodiment of a lens of the invention;

FIG. 3C is a perspective view of the third embodiment of a lens of the invention;

FIG. 3D is a perspective view of the fourth embodiment of a lens of the invention;

FIG. 3E is a perspective view of the fifth embodiment of a lens of the invention;

FIG. 3F is a perspective view of the sixth embodiment of a lens of the invention;

FIG. 5A is a perspective view of the seventh embodiment of a lens of the invention;

FIG. 5B is a perspective view of the eighth embodiment of a lens of the invention;

FIG. 5C is a perspective view of the ninth embodiment of a lens of the invention;

FIG. 5D is a perspective view of the tenth embodiment of a lens of the invention;

FIGS. 7A and 7B are a side view and a perspective view of the eleventh embodiment of a lens of the invention;

FIGS. 7C and 7D are a side view and a perspective view of the twelfth embodiment of a lens of the invention;

FIGS. 7E and 7F are a side view and a perspective view of the thirteenth embodiment of a lens of the invention;

FIGS. 10A and 10B are a side view and a perspective view of the eighteenth embodiment of a lens of the invention;

FIG. 10C is a bottom view of the eighteenth embodiment of a lens of the invention;

FIGS. 10D and 10E are a side view and a perspective view of the nineteenth embodiment of a lens of the invention;

FIG. 10F is a bottom view of the nineteenth embodiment of a lens of the invention;

FIGS. 11A and 11B are a side view and a perspective view of the twentieth embodiment of a lens of the invention;

FIGS. 11C and 11D are a side view and a perspective view of the twenty-first embodiment of a lens of the invention;

FIGS. 11E and 11F are a side view and a perspective view of the twenty-second embodiment of a lens of the invention;

FIG. 14 is a side view of the third embodiment of a light emitting module of the invention;

FIGS. 17A-17C are a perspective view, a side view and a bottom view of the first embodiment of a light grating of the invention;

FIGS. 17D-17F are a perspective view, a side view and a bottom view of the second embodiment of a light grating of the invention;

FIGS. 18A-18C are a perspective view, a side view and a bottom view of the third embodiment of a light grating of the invention;

FIGS. 18D-18F are a perspective view, a side view and a bottom view of the fourth embodiment of a light grating of the invention;

FIGS. 19A-19C are a perspective view, a side view and a bottom view of the fifth embodiment of a light grating of the invention;

FIGS. 19D-19F are a perspective view, a side view and a bottom view of the sixth embodiment of a light grating of the invention.

DETAILED DESCRIPTION OF THE INVENTION

Figure 1:
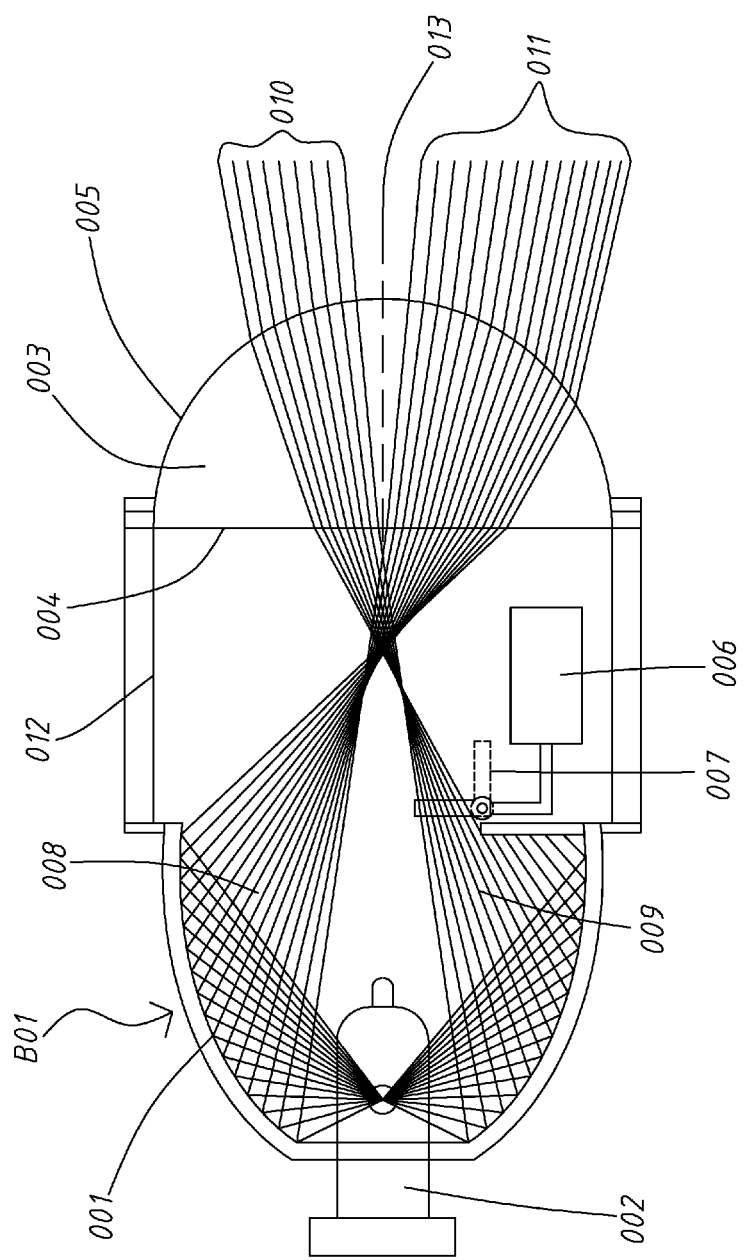
FIG. 1 depicts a structure and an optical path of a conventional light emitting module.

The following description is of the best-contemplated mode of carrying out the invention. This description is made for the purpose of illustrating the general principles of the invention and should not be taken in a limiting sense. The scope of the invention is best determined by reference to the appended claims.

In figures of the specification, for description of an inclined surface on a bottom of each lens, a vertical line and a transversely extending line are defined on the lens. The vertical central line includes a first vertical central line on the bottom portion and a second vertical central line positioned in front of or behind the first vertical central line. The transversely extending line includes a first transversely extending line on the bottom portion and a second transversely extending line in front of, behind, above or under the first transversely extending line.

Referring to FIGS. 2A to 2C, each lens is formed by a circular transparent plate 201. The transparent plate 201 includes two vertical planes 202 and 203. The vertical plane 202 is defined as a bottom portion and severs as a light incident surface, and at least one convex arced surface 204 or a curved surface is disposed on the other vertical plane 203 and serves as a light exiting surface. At least one positioning element 205 is disposed on the transparent plate 201. Although the positioning element 205 is a groove in this embodiment, the positioning element 205 can be a hole or a rib in other embodiments. The transparent plate 201 can be a polygon.

Figure 4D:
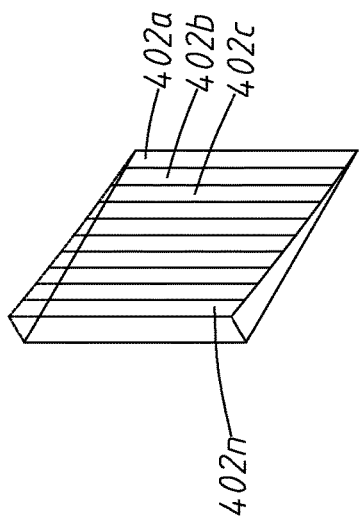
FIG. 4D is a perspective view of an embodiment of an inclined surface of the fourth embodiment of a lens of the invention.
Figure 4B:
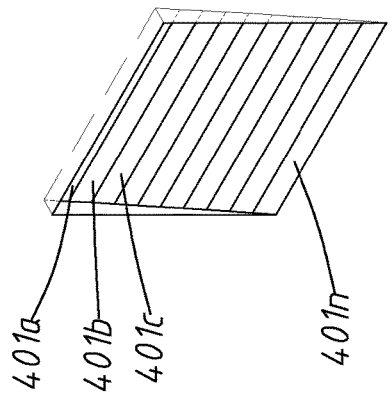
FIG. 4B is a perspective view of an inclined surface of the second embodiment of a lens of the invention.
Figure 4C:
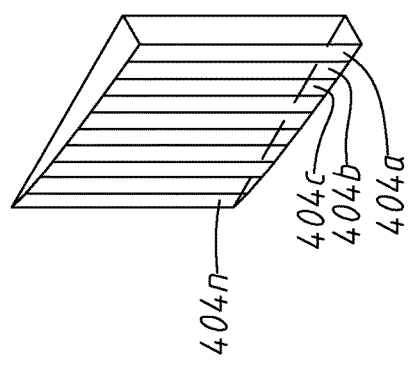
FIG. 4C is a perspective view of an embodiment of an inclined surface of the third embodiment of a lens of the invention.
Figure 4A:
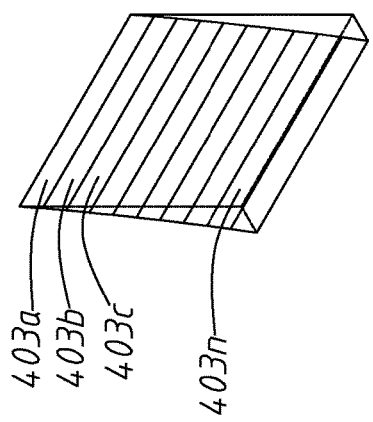
FIG. 4A is a perspective view of an inclined surface of the first embodiment of a lens of the invention.

Referring to FIG. 3A, a lens A01 has a structure similar to the lens in FIG. 2A. An inclined surface 304 is disposed on the bottom portion 301 and located on a left hand side of a vertical central line 303 under a transversely extending line 302. The inclined surface 304 extends from a top located on the transversely extending line 302 to the bottom portion 301. The closer a position on the inclined surface 304 is located to the bottom portion 301, and the further the position is the away from a top portion of the lens A01. The inclined surface 304 is a single smooth inclined surface and depressed in the bottom portion 301 in this embodiment, and however a plurality of inclined surfaces 401a, 401b, 401c to 401n are disposed on the bottom portion 301 in another embodiment as shown in FIG. 4A. The inclined surfaces 401a, 401b, 401c to 401n are connected to each other and have different inclined angles. The closer the inclined surface 401a, 401b, 401c, . . . , or 401n is located to the bottom portion 301, the further the inclined surface 401a, 401b, 401c, . . . , or 401n is away from the top portion. The transversely extending line 302 is in front of and above the transversely extending line 305 located on the bottom portion 301. The vertical central line 303 is in front of the vertical central line 312 located on the bottom portion 301. The inclined surface 304 causes an illumination area of the left half portion is lower than an illumination area of the right half portion. In another embodiment, the inclined surface 304 extend from a top located on the transversely extending line 302, and the closer a position is located to the bottom portion 301, the closer the position is located to the top portion of the lens A01, whereby an illumination area of the left half portion is higher than an illumination area of the right half portion. Referring to FIG. 3B, a lens A02 has a structure similar to the structure shown in FIG. 2A. An inclined surface 306 is disposed on the bottom portion 307 and located on the left hand side of a vertical central line 310 under a transversely extending line 309. The inclined surface 306 extend from one side of the vertical central line 310 to the left side of the lens A02, and the closer a position on the inclined surface 306 is located to the left side of the lens A02, the closer the position is located to the top portion of the lens A02. The inclined surface 306 is a single smooth inclined surface and depressed on the bottom portion 307. In another embodiment, the inclined surface includes a plurality of inclined surfaces 402a, 402b, 402c, . . . and 402n located from a right side to a left side, connected to each other and having different inclined angles as shown in FIG. 4B. The closer the inclined surface 402a, 402b, 402c, . . . or 402n is located to the inclined surface 402n, the closer the inclined surface 402a, 402b, 402c, . . . or 402n is located to the top portion of the lens. The transversely extending line 309 is located above a transversely extending line 308 on the bottom portion 307. The vertical central line 310 is located on the bottom portion 307. The inclined surface 306 refracts a portion of light to a right area of an illuminating region, and a plane on the right hand side of the vertical central line 310 originally refracts light to the right area of the lens so that a left area of the illuminating region is darker than the right area. In another embodiment, the inclined surface 306 extend from one side of the vertical central line 310 to the left side of the lens A02, and the closer a position on the inclined surface 306 is located to the left side of the lens A02, the further the position is located away from the top portion of the lens A02, whereby a left area of an illumination region is larger than a right area of the illumination region. Referring to FIG. 3C, a lens A03 has a structure similar to the structure shown in FIG. 2A. An inclined surface 311 is disposed on the bottom portion 316 and located on a left side of a vertical central line 313 under a transversely extending line 319. The inclined surface 311 has two inclined directions. One of the inclined directions is from the top portion to the bottom portion 316 of the lens A03, and the other inclined direction is from a right side to a left side of the lens A03. The closer a position is located to the bottom portion 316, the further the position is located away from the top portion. The closer a position is located to the left side of the lens A03, the closer the position is located to the top portion of the lens A03. That is the lens A03 includes the inclined direction of the inclined surface 304 of the lens A01 and the inclined direction of the inclined surface 306. The inclined surface 311 is a single smooth inclined surface and depressed from the bottom portion 316. The transversely extending line 319 is in front of and above the transversely extending line 318 on the bottom portion 316, and the vertical central line 313 is in front of the vertical central line 320 on the bottom portion 316. The inclined surface 311 refracts light to a left-lower area and a right-higher area so that an illuminating region has a darker and lower left illuminating area and a brighter and higher illuminating area. Referring to FIG. 3D, a lens A04 has a structure similar to the structure shown in FIG. 2A. An inclined surface 321 is disposed on a bottom portion 322 and located on the left hand side of a vertical central line 310 under a transversely extending line 309. The inclined surface 322 has an inclined direction and optical refraction features the same as the inclined surface 304 of the lens A01 of FIG. 3A. The inclined surface 321 is a single smooth inclined surface and protrudes from the bottom portion 322. In another embodiment, the inclined surface includes a plurality of inclined surfaces 403a, 403b, 403c, . . . and 403n located from a right side to a left side, connected to each other and having different inclined angles. The closer the inclined surface 403a, 403b, 403c, . . . or 403n is located to the inclined surface 403n, the further the inclined surface 403a, 403b, 403c, . . . or 403n is located away from the top portion of the lens. The transversely extending line 324 is located above a transversely extending line 323 on the bottom portion 322. The vertical central line 325 is located on the bottom portion 322. The inclined surface 321 is a structure having the same effect as the inclined surface 304 of the lens A01 of FIG. 3A. That is the bottom portion 301 around the inclined surface 304 is removed to make the inclined surface 304 protruding from the bottom portion 301. Referring to FIG. 3E, a lens A05 has a structure similar to the structure shown in FIG. 2A. An inclined surface 326 is disposed on a bottom portion 327 and located on the left hand side of a vertical central line 331 under a transversely extending line 329. The inclined surface 326 has an inclined direction and optical refraction features the same as the inclined surface 306 of the lens A02 of FIG. 3B. The inclined surface 326 is a single smooth inclined surface and protrudes from the bottom portion 327. In another embodiment, the inclined surface includes a plurality of inclined surfaces 404a, 404b, 404c, . . . and 404n located from a right side to a left side, connected to each other and having different inclined angles as shown in FIG. 4D. The closer the inclined surface 404a, 404b, 404c, . . . or 404n is located to the inclined surface 404n, the closer the inclined surface 404a, 404b, 404c, . . . or 404n is located to the top portion of the lens. The transversely extending line 329 is located above a transversely extending line 328 on the bottom portion 327. The vertical central line 331 is located behind a vertical central line 330 on the bottom portion 327. The lens A05 has a structure having the same effect as the lens A02 of FIG. 3B. Referring to FIG. 3F, a lens A06 has a structure similar to the structure of FIG. 2A. An inclined surface 332 is disposed on the bottom portion 333 and located on a left side of a vertical central line 337 under a transversely extending line 335. The inclined surface 332 has two inclined directions. One of the inclined directions is from a top disposed on the transversely extending line 335 to the bottom portion of the lens A06, and the other inclined direction is from a right side located on a vertical central line 337 behind the vertical central line 336 to a left side of the lens A06. The closer a position is located to the bottom portion 333, the further the position is located away from the top portion. The closer a position is located to the left side of the lens A06, the closer the position is located to the top portion of the lens A06. The transversely extending line 335 is above the transversely extending line 334 on the bottom portion 333, and the vertical central line 337 is behind the vertical central line 336 on the bottom portion 333. The inclined surface 332 is a single smooth inclined surface and protrudes from the bottom portion 333. The inclined surface 332 has the same optical features as the inclined surface 311 of the lens A03 of FIG. 3C. The lens A06 has the same optical effect as the lens A03 of FIG. 3C. Although the inclined surfaces of the embodiments above are disposed on a left side of the bottom portion of the lens, the inclined surfaces can also be disposed on the right side of the bottom portion. The inclined angle of the inclined surfaces depends on the desired incident angle of light. The surface includes a plurality of inclined surfaces is approximated to a curved surface or an arced surface.

Figure 6D:
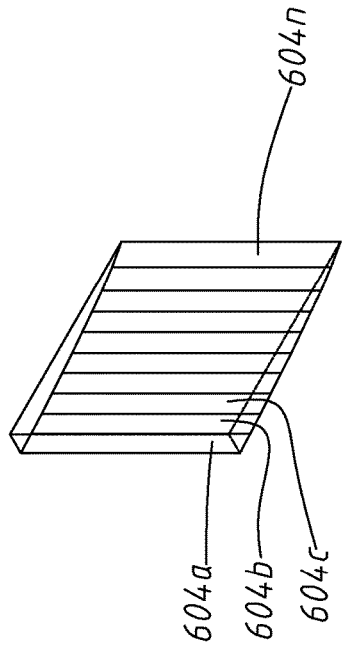
FIG. 6D is a perspective view of an inclined surface of the tenth embodiment of a lens of the invention.
Figure 6B:
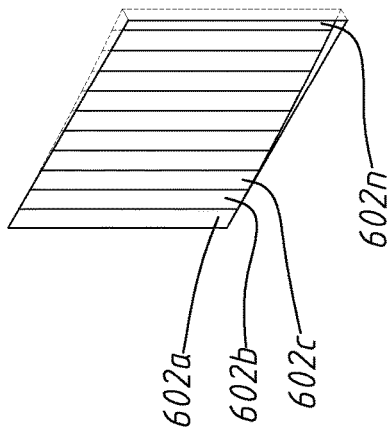
FIG. 6B is a perspective view of an inclined surface of the eighth embodiment of a lens of the invention.
Figure 6C:
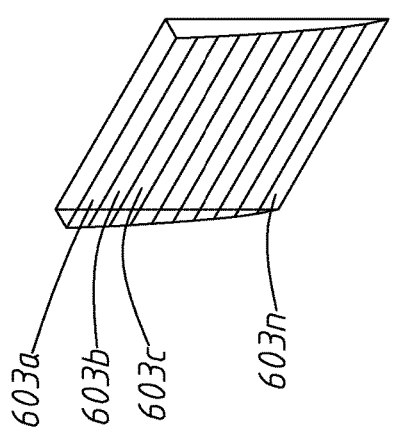
FIG. 6C is a perspective view of an inclined surface of the ninth embodiment of a lens of the invention.
Figure 6A:
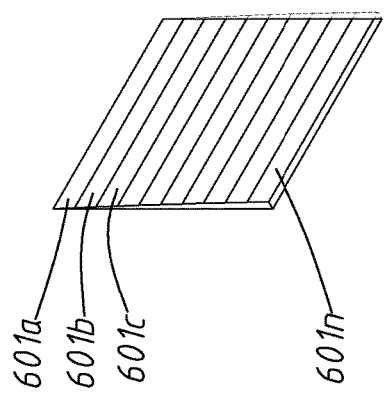
FIG. 6A is a perspective view of an inclined surface of the seventh embodiment of a lens of the invention.

Referring to FIG. 5A, a lens A07 has a structure similar to the structure of FIG. 3B and has an inclined surface 502 the same as the inclined surface 306 of the lens A02. The lens A07 further has an inclined surface 503 disposed on a right side of a vertical central line 506 under a transversely extending line 505 on a bottom portion 501. The inclined surface 503 extends from a top located on a transversely extending line 505 to the bottom portion 501. The closer a position on the inclined surface 503 is located to the bottom portion 501, the closer the position is located to the top portion of the lens. The inclined surface 503 is a single smooth inclined surface and depressed from the bottom portion 501. In another embodiment, the inclined surface includes a plurality of inclined surfaces 601a, 601b, 601c, . . . and 601n connected to each other and having different inclined angles as shown in FIG. 6A. The closer the inclined surface 601a, 601b, 601c, . . . or 601n is located to the inclined surface 601n, the closer the inclined surface 601a, 601b, 601c, . . . or 601n is located to the top portion of the lens. The transversely extending line 505 is located above a transversely extending line 504 on the bottom portion 501. The vertical central line 506 is located on the bottom portion 501. The inclined surface 503 refracts light to a right area which is located higher than an area to which light is refract by a plane. The inclined surface 503 collocating the inclined surface 502 to form an illumination region has a darker and lower left area and a brighter and a higher right area. Referring to FIG. 5B, a lens A08 has a structure similar to the structure of FIG. 3C and has an inclined surface 508 the same as the inclined surface 311 of the lens A03. The lens A08 further has an inclined surface 509 disposed on a right side of a vertical central line 512 under a transversely extending line 511 on a bottom portion 507. The inclined surface 509 extends from a left side of the inclined surface on the vertical central line 512 to a right side of the lens A08. The closer a position on the inclined surface 509 is located to the right side of the lens A08, the closer the position is located to the top portion of the lens A08. The inclined surface 509 is a single smooth inclined surface and depressed from the bottom portion 507. In another embodiment, the inclined surface includes a plurality of inclined surfaces 602a, 602b, 602c, . . . and 602n connected to each other and having different inclined angles as shown in FIG. 6B. The closer the inclined surface 602a, 602b, 602c, . . . or 602n is located to the inclined surface 602n, the closer the inclined surface 602a, 602b, 602c, . . . or 602n is located to the top portion of the lens A08. The transversely extending line 511 is located above a transversely extending line 510 on the bottom portion 507. The vertical central line 512 is located on the bottom portion 507. The inclined surface 509 refracts light to a right area which is smaller than an area to which light is refract by a plane. The inclined surface 509 collocating the inclined surface 508 to form an illumination region has a darker and lower left area and a brighter and a higher right area. Referring to FIG. 5C, a lens A09 has a structure similar to the structure of FIG. 3E and has an inclined surface 514 the same as the inclined surface 326 of the lens A05. The lens A09 further has an inclined surface 515 disposed on a right side of a vertical central line 518 under a transversely extending line 517 on a bottom portion 513. The inclined surface 515 extends from a top of the inclined surface 515 on a transversely extending line 516 behind a transversely extending line 517 to the bottom portion 513 of the lens A08. The closer a position on the inclined surface 515 is located to the bottom portion 513 of the lens A09, the closer the position is located to the top portion of the lens A09. The inclined surface 515 is a single smooth inclined surface and protrudes from the bottom portion 513. In another embodiment, the inclined surface includes a plurality of inclined surfaces 603a, 603b, 603c, . . . and 603n connected to each other and having different inclined angles as shown in FIG. 6C. The closer the inclined surface 603a, 603b, 603c, . . . or 603n is located to the inclined surface 603n, the closer the inclined surface 603a, 603b, 603c, . . . or 603n is located to the top portion of the lens A09. The inclined surface 515 has optical refraction features the same as the inclined surface 503 of FIG. 5A. The transversely extending line 517 is located above a transversely extending line 526 on the bottom portion 513. The lens A09 has the same optical effect as the lens A07 of FIG. 5A. Referring to FIG. 5D, a lens A10 has a structure similar to the structure of FIG. 3F and has an inclined surface 520 the same as the inclined surface 332 of the lens A06. The lens A10 further has an inclined surface 521 disposed on a right side of a vertical central line 524 under a transversely extending line 523 on a bottom portion 519. The inclined surface 521 extends from a left side of the inclined surface 521 on a vertical central line 524 behind a vertical central line 525 to a right side of the lens A10. The closer a position on the inclined surface 521 is located to the right side of the lens A10, the closer the position is located to the top portion of the lens A10. The inclined surface 521 is a single smooth inclined surface and protrudes from the bottom portion 519. In another embodiment, the inclined surface includes a plurality of inclined surfaces 604a, 604b, 604c, . . . and 604n connected to each other and having different inclined angles as shown in FIG. 6D. The closer the inclined surface 604a, 604b, 604c, . . . or 604n is located to the inclined surface 604n, the closer the inclined surface 604a, 604b, 604c, . . . or 604n is located to the top portion of the lens A10. The inclined surface 521 has optical refraction features the same as the inclined surface 508 of FIG. 5B. Although the inclined surfaces of the embodiments above are disposed on a left side of the bottom portion of the lens, the inclined surfaces can also be disposed on the right side of the bottom portion. The inclined angle of the inclined surfaces depends on the desired incident angle of light. The surface includes a plurality of inclined surfaces is approximated to a curved surface or an arced surface.

Referring to FIGS. 7A and 7B, a lens A11 has a structure similar to the structure of FIG. 2A. The lens A11 includes two arced inclined surfaces 705 and 706 disposed under a transversely extending line 704 on a bottom portion 702. The arced inclined surface 706 extends from one side of the arced inclined surface 706 located on a semi-circular arc 707 on the bottom portion 702 to a transition line 708 located on one side of the other arced inclined surface 705. The closer a position on the arced inclined surface 706 is located to a lateral side of the lens A11, the closer the position is located to a top portion of the lens A11. The arced inclined surface 705 extends from the transition line 708 to the lateral side of the lens A11. The closer a position on the arced inclined surface 706 is located to a lateral side of the lens A11, the further the position is located away from the top portion of the lens A11. The arced inclined surfaces 705 and 706 form a depression 709 on the bottom portion 702. The transition line 708 is the lowest position of the depression 709. The depression 709 has an arced shape of 180 degree. In another embodiments, there can be two depressions of 90 degree arced shape formed on the bottom portion 702, and each depression includes two arced inclined surfaces of 90 degree arced shape. Such a depression can be formed on the second embodiment to the tenth embodiment of the lens of the invention. The depression 709 formed by the arced inclined surfaces 705 and 706 refracts light to a specific area. Referring to FIGS. 7C and 7D, a lens A12 has a structure similar to the structure of FIG. 2A. The lens A12 includes two arced inclined surfaces 712 and 713 disposed under a transversely extending line 718 on a bottom portion 710. The arced inclined surface 713 extends from one side of the arced inclined surface 713 located on an intersecting point 714 of the transversely extending line 718 above a transversely extending line 711 and a vertical central line 717 to a transition line 716 located on one side of the other arced inclined surface 712. The closer a position on the arced inclined surface 713 is located to a lateral side of the lens A12, the closer the position is located to a top portion of the lens A12. The arced inclined surface 712 extends from the transition line 716 to the lateral side of the lens A12. The closer a position on the arced inclined surface 712 is located to a lateral side of the lens A12, the further the position is located away from the top portion of the lens A12. The arced inclined surfaces 712 and 713 form a depression 715 on the bottom portion 710. The transition line 716 is the lowest position of the depression 715. The depression 715 has an arced shape of 180 degree. In another embodiments, the depression can be less than 180 degree or only 90 degree on one side of a vertical central line 717. In another embodiment, the depression can be replaced by a structure including a protrusion to form a concave curved surface. The structure has the same optical effect as the lens A01 of FIG. 3A. In another embodiment, one end of the arced inclined surface 713 can be disposed at a point on a transversely extending line 718 on one side of the intersecting point 714 or at a point of the transversely extending line 711. When the end of the arced inclined surface 713 is disposed on the intersecting point 714, light is refracted to a position above a horizontal central line of the lens A12. When the end of the arced inclined surface 713 is disposed at the point on the transversely extending line 718, light is refracted to a position higher than the horizontal central line and near one lateral side. Such a structure can prevent light from dazzling a driver's eyes. In another embodiment, the depression 715 can be disposed under the central line 711 on the bottom portion 710. One end of the arced inclined surface 713 can be disposed at a central point 727 on the bottom portion 710 or at a point on the transversely extending line 711. Light is refracted by the lens A12 to a position on the horizontal central line or near one lateral side. Referring to FIGS. 7E and 7F, a lens A13 has a structure similar to the structure of FIG. 2A. A plurality of arced inclined surfaces 722a, 722b, 722c, 722k to 722z under a transversely extending line 720 on a bottom portion 719. The arced inclined surfaces 722a, 722b, 722c and 722k form an arced surface or a curved surface having one end located at an intersecting point 723 of a transversely extending line 720 and a vertically extending line 725 on the right side of the vertical central line 726. The transversely extending line 720 is the transverse central line of the bottom portion 719. The arced inclined surfaces 722a, 722b, 722c and 722k are located from the intersecting point 723 to a transition line 724. The transition line 724 is connected to one side of the arced inclined surface 722z. The closer the arced inclined surfaces 722a, 722b, 722c or 722k is located to a lateral side of the lens A13, the closer the arced inclined surfaces 722a, 722b, 722c or 722k is located to a top portion of the lens A13. The closer a position on the arced inclined surface 722z is located to a lateral side of the lens A13, the further the position is located away from the top portion of the lens A13. The arced inclined surfaces 722a, 722b, 722c, 722k and 722z form a depression 721. The transition line 724 is one side of the arced inclined surface 722k and is also the deepest position of the depression 721. The depression 721 is formed on the bottom portion 719 and has an arced shape of 180 degree. In another embodiment, the depression 721 can be less than 180 degree or has an arced shape of 90 degree on one side of a vertically extending line 725. In another embodiment, the depression 721 can protrude from the bottom portion 719 or a portion of the depression 721 protrudes from the bottom portion 719. In another embodiment, one end of the arced inclined surface 722a can be disposed at a center point 728 of the bottom portion 719, a point of a vertical central line 726 above the center point 728, or a point on the vertically extending line 725 above the intersecting point 723.

Figure 8D:
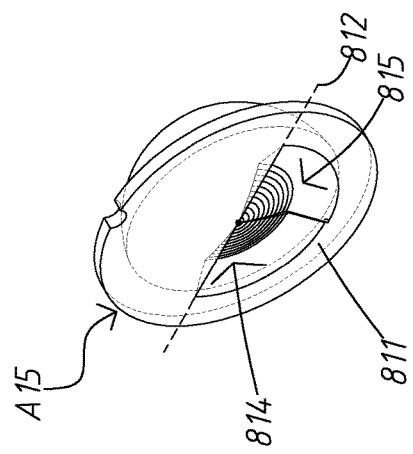
FIGS. 8C and 8D are a side view and a perspective view of the fifteenth embodiment of a lens of the invention.
Figure 8C:
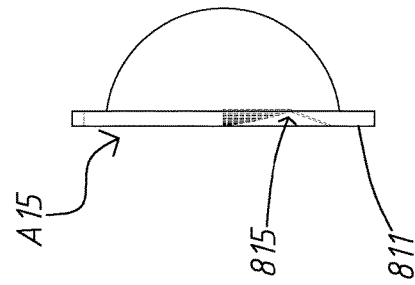
Figure 8B:
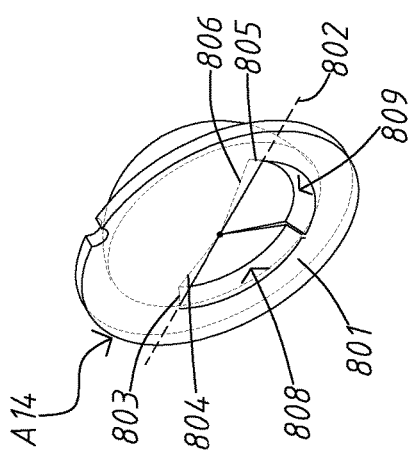
FIGS. 8A and 8B are a side view and a perspective view of the fourteenth embodiment of a lens of the invention.
Figure 8A:
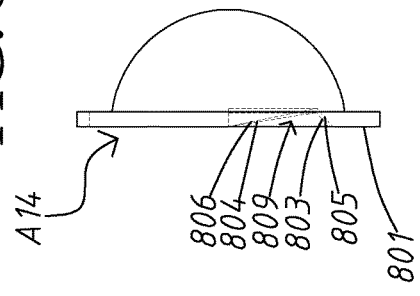

Referring to FIGS. 8A and 8B, a lens A14 has a structure similar to the structure of FIG. 2A. Two inclined surfaces are disposed on one side of a transversely extending line 802. Each of the inclined surfaces 803, 804, 805 and 806 has an arced shape of 90 degree. Two inclined surfaces form a depression 808 or 809 which has a structure similar to the depression 715 of FIG. 7D. Referring to FIGS. 8C and 8D, a lens A15 has a structure similar to the structure of FIG. 2A. A plurality of arced inclined surfaces having an arced shape of 90 degree are disposed on one side of a transversely extending line 812. A plurality of arced inclined surfaces form depressions 814 and 815 which have a structure similar to the depression 721 of FIG. 7F.

Figure 9D:
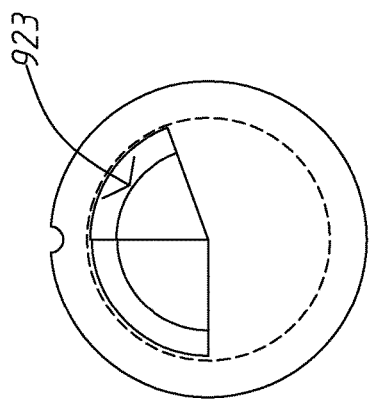
FIGS. 9D and 9E are a side view and a perspective view of the seventeenth embodiment of a lens of the invention.
Figure 9A:
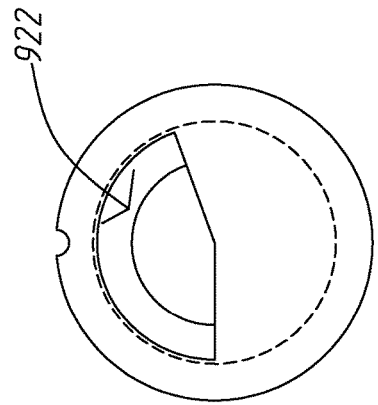
FIGS. 9A and 9B are a side view and a perspective view of the sixteenth embodiment of a lens of the invention.
Figure 9E:
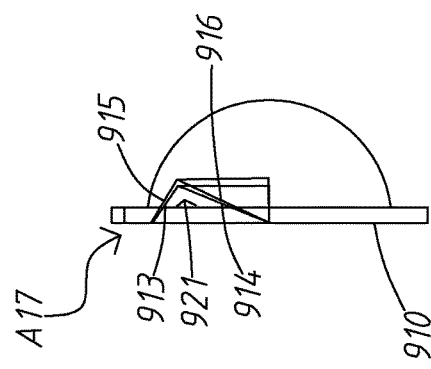
Figure 9B:
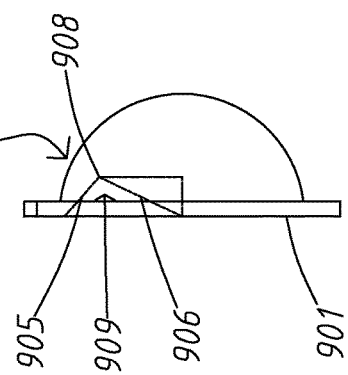
Figure 9F:
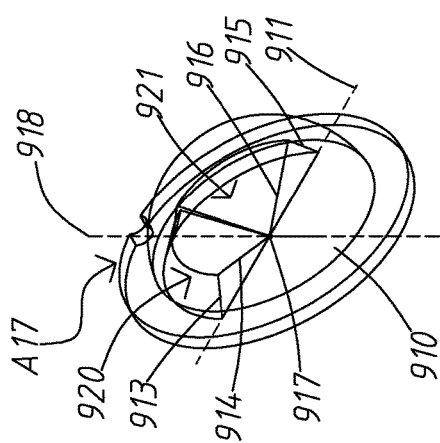
FIG. 9F is a bottom view of the seventeenth embodiment of a lens of the invention.
Figure 9C:
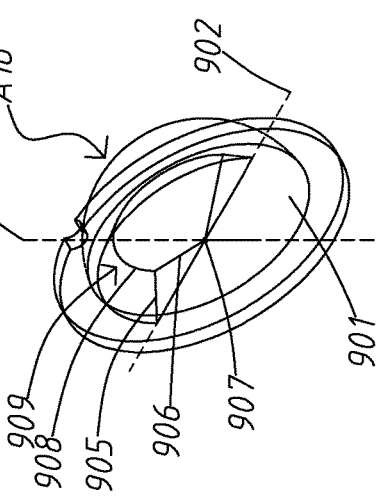
FIG. 9C is a bottom view of the sixteenth embodiment of a lens of the invention.

Referring to FIGS. 9A and 9B, a lens A16 has a structure similar to the structure of FIG. 2A. The lens A16 includes two arced inclined surfaces 905 and 906 disposed under a transversely extending line 902 on a bottom portion 901. The arced inclined surface 906 extends from an intersecting point 907 of a transversely extending line 902 and a vertical central line 912 to a transition line 908 located on one side of the other arced inclined surface 905. The closer a position on the arced inclined surface 906 is located to a lateral side of the lens A16, the closer the position is located to a top portion of the lens A16. The arced inclined surface 905 extends from the transition line 908 to the lateral side of the lens A16. The closer a position on the arced inclined surface 906 is located to a lateral side of the lens A16, the further the position is located away from the top portion of the lens A16. The arced inclined surfaces 905 and 906 form a depression 909 on the bottom portion 901. The transition line 908 is the lowest position of the depression 909. The depression 909 has an arced shape of 180 degree in this embodiment. In another embodiments, the depression 909 can be formed by two arced inclined surfaces 905 and 906 which have an arced shape of less than 180 degree so that the depression 909 may have a structure like a depression 922. Although the depression 909 is depressed from the bottom portion 901 in this embodiment, a structure or a portion of the structure can protrude from the bottom portion 901 in another embodiment. One side of the arced inclined surface 906 can be disposed at one point of a transversely extending line 902 on one side of the intersecting point 907. The transversely extending line 902 is a transversely central line of the bottom portion 901. Referring to FIGS. 9C and 9D, a lens A17 has a structure similar to the structure of FIG. 2A. Two inclined surfaces are disposed on one side of a transversely extending line 911 of a bottom portion 910. Each of the inclined surfaces 913, 914, 915 and 916 is an arced inclined surface. The arced inclined surfaces 914 and 916 extend from an interesting point 917 of a transversely extending line 911 and a vertical central line 918. The arced inclined surfaces have a structure similar to the arced inclined surface 905 and 906 to form two depressions 920 and 921. The depressions 920 and 921 have an arced shape of 90 degree. In another embodiment, the arced inclined surfaces 915 and 916 have an arced shape less than 90 degree. A depression 923 of FIG. 9F has an arced shape of less than 90 degree. The depressions 920 and 921 are depressed from the bottom portion 910 in this embodiment, in another embodiment, the structure can protrude from the bottom portion 910. One side of the arced inclined surfaces 914 and 916 can be disposed at a point on a transversely extending line 911 on one side of the intersecting point 917 in this embodiment, in another embodiment, one side of the arced inclined surface 914 is disposed at the intersecting point 917, and one side of the arced inclined surface 916 is disposed at one point of a vertical central line 918. The transversely extending line 911 is a transverse central line of the bottom portion 910.

Referring to FIGS. 10A and 10B, a lens A18 has a structure similar to the structure of the lens A16 of FIG. 9A. The lens A18 further includes a depression 1007 including a plurality of arced inclined surfaces 1005a, 1005b, 1005c, 1005h to 1005z connected to each other and having different inclined angle. The arced inclined surfaces 1005a, 1005b, 1005c to 1005h form an arced surface or a curved surface having one end located at an intersecting point 1008 of a transversely extending line 1002 and a vertically extending line 1003. The arced inclined surfaces 1005a, 1005b, 1005c to 1005h are located from the intersecting point 1008 to a transition line 1006. The transition line 724 is connected to one side of the arced inclined surface 722z. The closer the arced inclined surfaces 1005a, 1005b, 1005c to 1005h is located to a lateral side of the lens A18, the closer the arced inclined surfaces 1005a, 1005b, 1005c to 1005h is located to a top portion of the lens A18. The closer a position on the arced inclined surface 1005z is located to a lateral side of the lens A18, the further the position is located away from the top portion of the lens A18. The depression 1007 has an arced shape of 180 degree in this embodiment, in another embodiment, each of the arced inclined surface has an arced shape less than 180 degree, whereby the depression 1007 has an arced shape of less than 180 degree as the depression 1016 of FIG. 10C. The depression 1007 is depressed from the bottom portion 1001 in this embodiment, however in another embodiment, the structure can protrude from the bottom portion 1001. One side of the arced inclined surface can be disposed at a point on the transversely extending line 1002 on one side of the intersecting point 1008. The transversely extending line 1002 is a transverse central line of the bottom portion 1001. Referring to FIGS. 10D and 10E, a lens A19 has a structure similar to the lens A18 of FIG. 10A. The lens A19 includes depressions 1012 and 1013 disposed above a transversely extending line 1010 on a bottom portion 1009. The depressions 1012 and 1013 including a plurality of arced inclined surfaces. Each of the arced inclined surfaces has a structure similar to the arced inclined surface of the depression 1007 of FIG. 10A. The depressions 1012 and 1013 have an arced shape of 90 degree in this embodiment, in another embodiment, the depression 1012 has an arced shape less than 90 degree as a depression 1017 of FIG. 10F. The depressions 1012 and 1013 are depressed from the bottom portion 1009 in this embodiment, in another embodiment, a structure can protrude from the bottom portion 1009. The arced inclined surface 1012a and 1013a extend from an intersecting point 1014 of a transversely extending line 1010 and a vertical central line 1011 in this embodiment. In another embodiment, the arced inclined surface 1012a and 1013a extend from a point on the transversely extending line 1010 on one side of the intersecting point 1014. In another embodiment, the arced inclined surface 1013a extends from the intersecting point 1014, and the arced inclined surface 1012a extends from a point on a vertical central line 1011 above the intersecting point 1014.

Referring to FIGS. 11A and 11B, a lens A20 has a bottom structure similar to the bottom structure of the described embodiments. The lens A20 includes two convex arced surfaces 1101 and 1102 which serve as light exiting surfaces. The convex arced surfaces 1101 and 1102 are disposed above and under a transversely extending line 1110. The convex arced surfaces 1101 and 1102 are disposed on one side of a vertical central line 1113. The convex arced surfaces 1101 and 1102 have different diameters. Referring to FIGS. 11C and 11D, a lens A21 has a bottom structure similar to the bottom structure of the described embodiments. The lens A21 includes three convex arced surfaces 1103, 1104 and 1105 which serve as light exiting surfaces. The convex arced surfaces 1104 and 1105 are disposed above a transversely extending line 1111 in this embodiment. The convex arced surfaces 1104 and 1105 are disposed above and under the transversely extending line 1111 and on two sides of a vertical central line 1114. The convex arced surface 1103 is disposed under the transversely extending line 1111 in this embodiment. The convex arced surface 1103 is disposed on one side of the vertical central line 1114. The convex arced surfaces 1103, 1104 and 1105 have at least two different diameters. Referring to FIGS. 11E and 11F, a lens A22 has a bottom structure similar to the bottom structure of the described embodiments. The lens A22 includes four convex arced surfaces 1106, 1107, 1108 and 1109 which serve as light exiting surfaces. The convex arced surfaces 1108 and 1109 are disposed above a transversely extending line 1112. The convex arced surfaces 1106 and 1107 are disposed under the transversely extending line 1112. The convex arced surfaces 1106, 1107, 1108 and 1109 have at least two different diameters. In another embodiment, the lens includes a plurality of convex arced surfaces of different diameters connected to each other to form a convex curved surface.

Figures 12A, 12B:
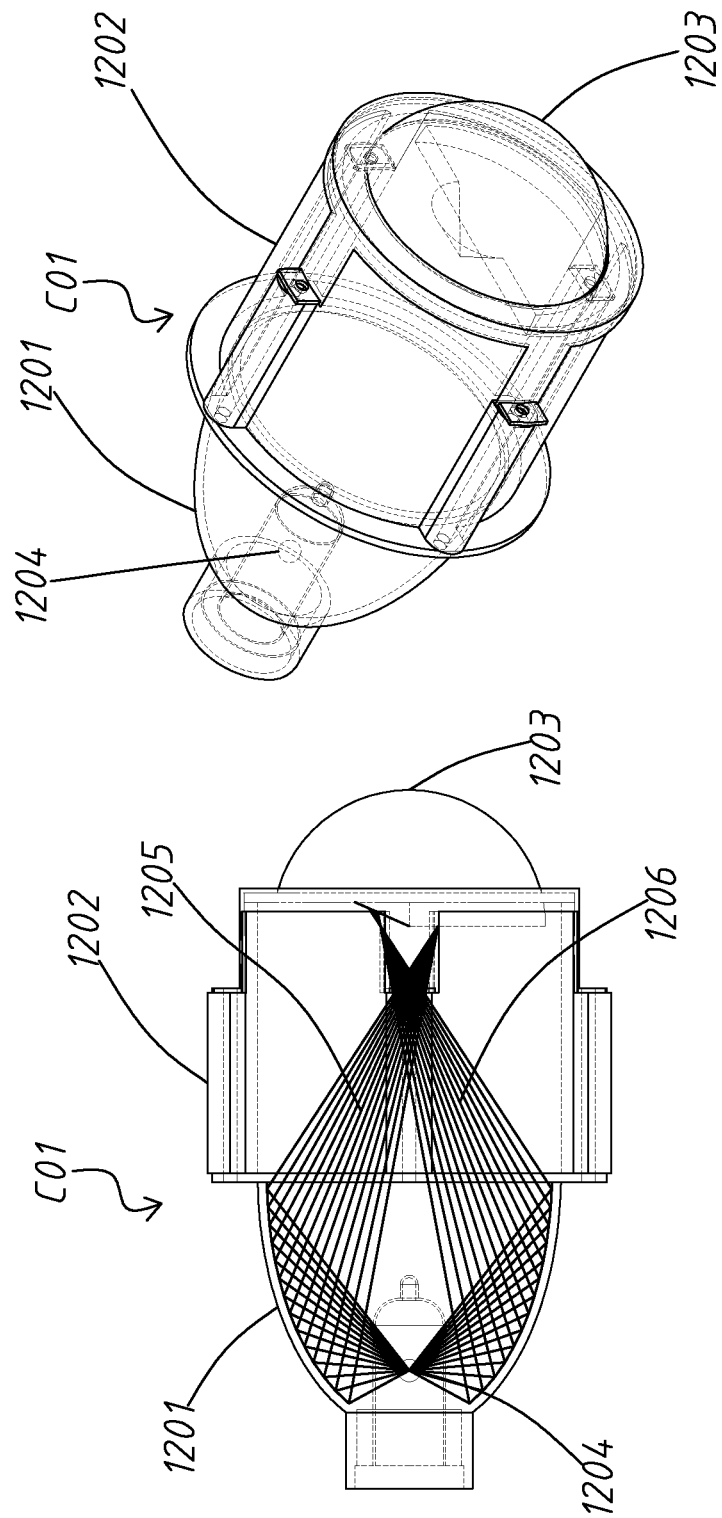
FIGS. 12A and 12B are a side view and a perspective view of the first embodiment of a light emitting module of the invention.

Referring to FIGS. 12A and 12B, a light emitting module C01 includes a reflector 1201 and a light source 1204 disposed in the reflector 1201. The light source 1204 can be a bulb, a light tube or light emitting diodes. The reflector 1201 has a bottom connected to one end of a hollow frame 1202, and a lens 1203 of the invention is disposed on another end of the hollow frame 1202. Light 1205 and 1206 from the light source 1204 is refracted by the lens 1203 to a predetermined region. The hollow frame 1202 can be a cylinder-shaped or a frame-shaped.

Figure 13A:
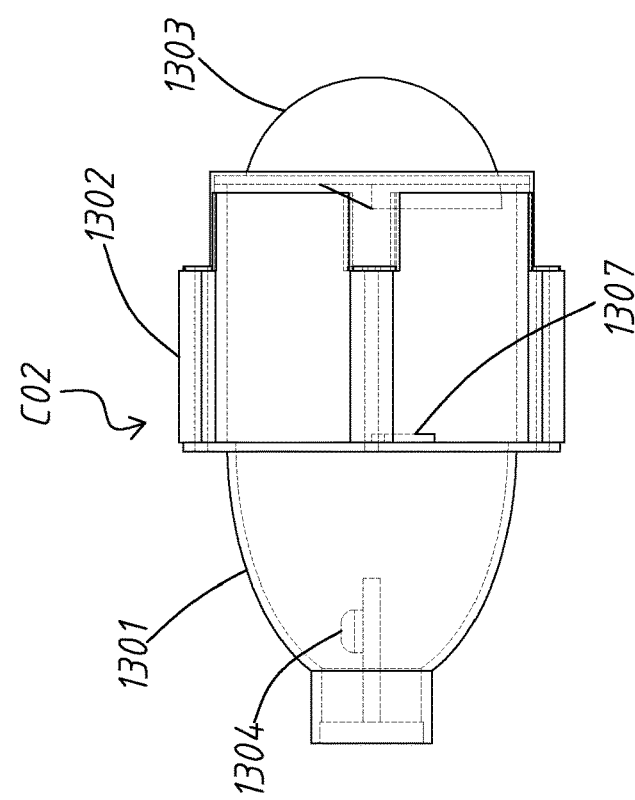
FIGS. 13A and 13B are a side view and a perspective view of the second embodiment of a light emitting module of the invention.
Figure 13B:
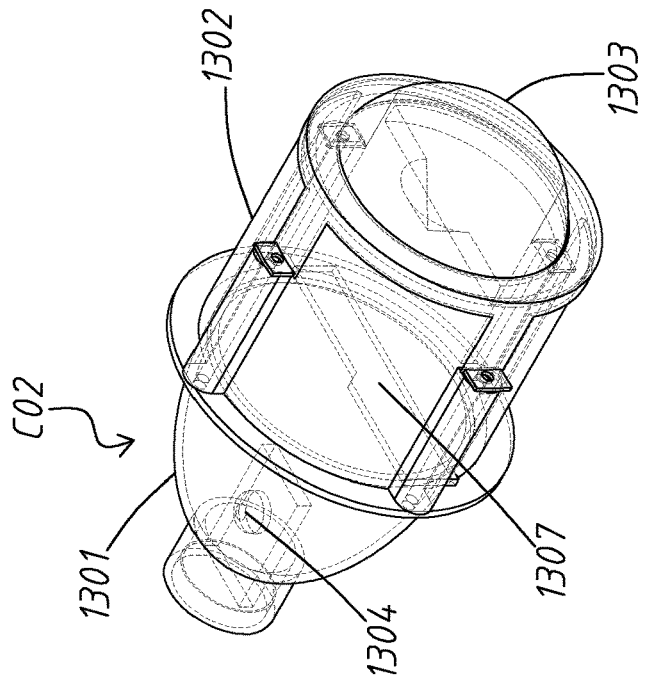

Referring to FIGS. 13A and 13B, a light emitting module C02 includes a reflector 1301 and a light source 1304 disposed in the reflector 1301. The reflector 1301 is connected to one end of a hollow frame 1302, and a lens 1303 is disposed on another end of the hollow frame 1302. A light shielding plate 1307 is disposed on a bottom of the reflector 1301.

Referring to FIG. 14, a light emitting module C03 includes a reflector 1401 and a light source 1404 disposed in the reflector 1401. The reflector 1401 is connected to one end of a hollow frame 1402, and a lens 1403 is disposed on another end of the hollow frame 1402. The lens 1403 can be a lens of the described embodiment or a convexo-plane lens. A positioning element 1407 is disposed in the hollow frame 1402. The positioning element 1407 can be a rail frame or a movable shaft. A light shielding plate 1408 is movably disposed on the positioning element 1407. The light shielding plate 1408 is connected to a retractable rod 1409 of an electromagnet 1411, whereby the electromagnet 1411 can change a position of the light shielding plate 1408.

Figure 15:
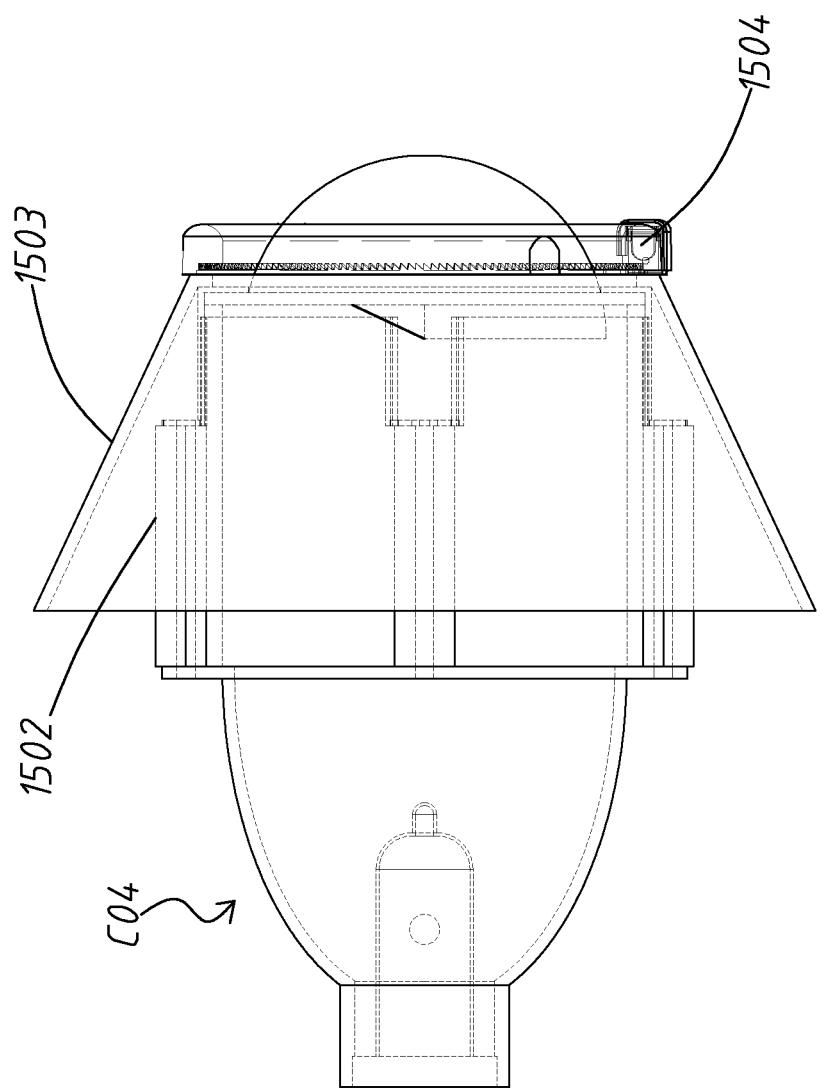
FIG. 15 is a side view of the fourth embodiment of a light emitting module of the invention.

Referring to FIG. 15, a light emitting module C04 has a structure similar to the light emitting module C01 of FIG. 12A. The light emitting module C04 further includes a conical panel 1503 disposed on the hollow frame 1502. A warning LED light emitting module 1504 can be disposed on the hollow frame 1502.

Figure 16A:
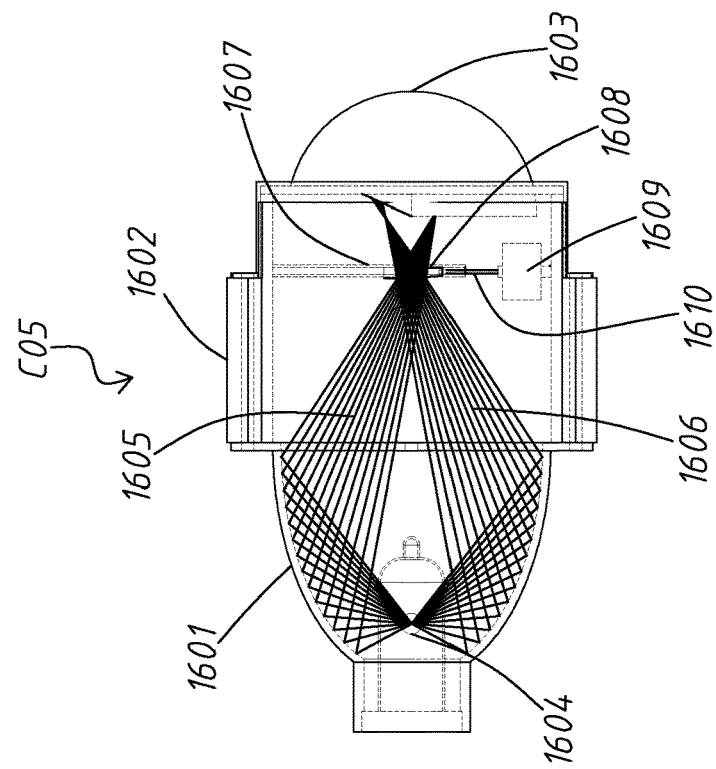
FIGS. 16A and 16B are a side view and a perspective view of the fifth embodiment of a light emitting module of the invention.
Figure 16B:
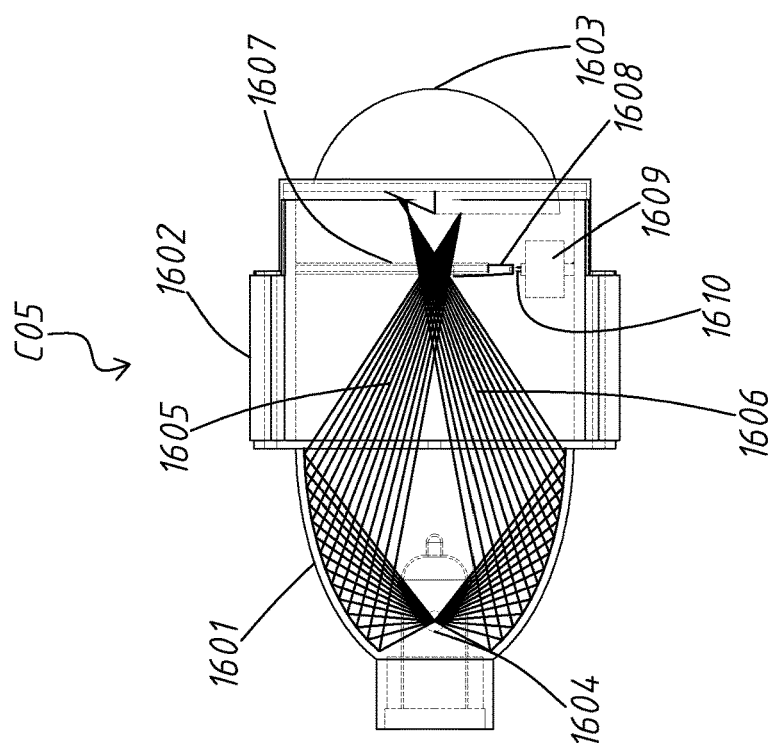

Referring to FIGS. 16A and 16B, a light emitting module C05 includes a reflector 1601 and a light source 1604 disposed in the reflector 1601. The reflector 1601 is connected to one end of a hollow frame 1602, and a lens 1603 is disposed on another end of the hollow frame 1602. The lens 1603 can be a lens of the described embodiment or a convexo-plane lens. A positioning element 1607 is disposed in the hollow frame 1602. The positioning element 1607 can be a rail frame or a movable shaft. A light grating 1608 is movably disposed on the positioning element 1607. The light grating 1609 is connected to a retractable rod 1610 of an electromagnet 1609. The electromagnet 1609 can change a position of the light grating 1608. Referring to FIG. 16A, the light grating 1608 is disposed under light 1605 and 1606, whereby the light enter the lens 1603 and is refracted by the lens 1603. Referring to FIG. 16B, the light grating 1608 is positioned on an optical path of light 1605 and 1606, the light 1605 and 1606 passes through the light grating 1608 to enter the lens 1603, whereby the light 1605 and 1606 have an incident angle different from the incident angle of FIG. 16A. The light 1605 and 1606 are refracted to two predetermined regions. When the light emitting module is applied to a head light of vehicles, it provides high beam and low beam and prevent the light efficiency from lowering as the conventional light emitting module of FIG. 1.

Referring to FIGS. 17A to 17C, a light grating D01 is made of a transparent plate 1701 having a top plane 1703 and a bottom plane 1702. An arced surface is formed on a central region of the top plane 1703 or the bottom plane 1702. In this embodiment, the arced surface 1704 is disposed on the bottom plane 1702, and the highest point of the arced surface 1704 is disposed on a central region of one side 1711 of the bottom plane 1702. The closer a position is located to two sides and lower side of the transparent plate 1701, the closer the position is located to the bottom plane 1702. Referring to FIGS. 17D to 17F, a light grating D02 is made of a transparent plate 1705 having a top plane 1707 and a bottom plane 1706. Two non-symmetrical arced surfaces 1709 and 1710 are disposed on two sides of a vertical central line 1713. The highest points of the arced surfaces 1709 and 1710 are disposed on a lateral side 1712 of the bottom plane 1706. The closer a position is located to two sides and lower side of the transparent plate 1705, the closer the position is located to the bottom plane 1706.

Referring to FIGS. 18A to 18C, a light grating D03 is made of a transparent plate 1801 having a top plane 1803 and a bottom plane 1802. A plurality of arced surfaces 1804a, 1804b, 1804c to 1804n connected to each other and having different inclined angles. The arced inclined surface 1804a on a highest position is formed on a central region of a lateral side 1805 of the bottom plane 1802. The closer the arced inclined surface is located to the arced inclined surface 1804n, the closer the arced inclined surface is located to the bottom plane 1802. The arced inclined surfaces are connected to each other to form an arced surface or a curved surface. Referring to FIGS. 18D to 18F, a light grating D04 is made of a transparent plate 1806 having a top plane 1808 and a bottom plane 1807. Two non-symmetrical curved surfaces 1809 and 1810 formed by a plurality of arced inclined surfaces. The highest points of two curved surfaces 1809 and 1810 are disposed on a central region of a lateral side 1811 and the bottom plane 1807.

Referring to FIGS. 19A to 19C, a light grating D05 has a structure similar to the light grating D01 of FIG. 17A. The light grating D05 includes an inclined surface 1903 disposed on one side of a vertical central line 1906 on the top plane 1902. The inclined surface 1903 is a smooth inclined surface and extends from an upper side 1904 to a lower side 1905. The closer a position on the inclined surface 1903 is located to the lower side 1905, the further the position is away from the top plane 1902. Referring to FIGS. 19D to 19F, a light grating D06 has a structure similar to the light grating of FIG. 17A. The light grating D06 includes a plurality of inclined surfaces 1909a, 1909b, 1909c to 1909n having different inclined angles and disposed on one side of a vertical central line 1908 on the bottom plane 1910. The inclined surfaces 1909a, 1909b, 1909c to 1909n are smooth inclined surfaces. The closer the inclined surface 1909a, 1909b, 1909c or 1909n is located to the lower side 1912 of the transparent plate 1907, the closer the inclined surface 1909a, 1909b, 1909c or 1909n is located to the top plane 1910, or the closer the inclined surface 1909a, 1909b, 1909c or 1909n is located to the lower side 1912, the further the inclined surface 1909a, 1909b, 1909c or 1909n is located away from the top plane 1910. The closer the inclined surface 1909a, 1909b, 1909c or 1909n is located to one lateral side of the transparent plate 1907, the closer the inclined surface 1909a, 1909b, 1909c or 1909n is located to the top plane 1910, or the closer the inclined surface 1909a, 1909b, 1909c or 1909n is located to one lateral side of the transparent plate 1907, the further the inclined surface 1909a, 1909b, 1909c or 1909n is located away from the top plane 1910. In this embodiment, the closer the inclined surface 1909a, 1909b, 1909c or 1909n is located to the lower side 1912 of the transparent plate 1907, the closer the inclined surface 1909a, 1909b, 1909c or 1909n is located to the top plane 1910.

Figure 20:
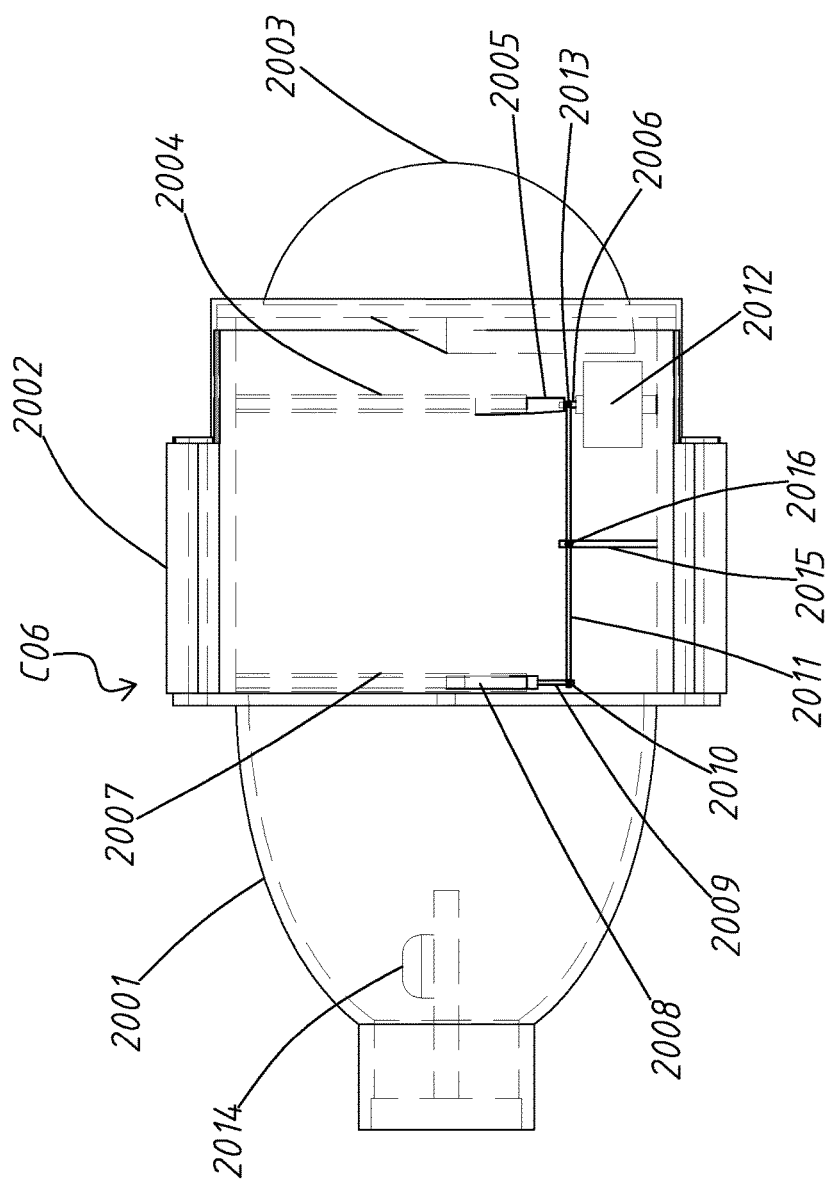
FIG. 20 is a side view of the sixth embodiment of a light emitting module of the invention.

Referring to FIG. 20, a light emitting module C06 includes a reflector 2001 and a light source 2014 disposed in the reflector 2001. The reflector 2001 is connected to one end of a hollow frame 2002, and a lens 2003 is disposed on another end of the hollow frame 2002. The lens 2003 can be the lens of described embodiments, a convexo-plane lens or a biconvex lens. The hollow frame 2002 includes a positioning element 2004 such as a rail or movable shaft. A light grating 2005 is movable disposed on the positioning element 2004. The light grating 2005 is connected to a retractable rod 2006 of an electromagnet 2012. The hollow frame 2002 further includes a positioning element 2007. A light shielding plate 2008 is movably disposed on the positioning element 2007. The light shielding plate 2008 is connected to one side of s first frame 2009. Another side of the first frame 2009 and one side of a second frame 2011 are joined to a movable shaft 2010. Another side of the second frame 2011 is connected to a movable shaft 2013 of a retractable rod 2006 of an electromagnet 2012. A central portion of the second frame 2011 is disposed on a movable shaft 2016 of a positioning element 2015, whereby the electromagnet 2012 can change the position of the light grating 2005 and the light shielding plate 2008. The light grating 2005 and the light shielding plate 2008 can move together in this embodiment.

The light emitting module can refract all light of the light source through the lens to control the light emitting in a predetermined angle. Each of the smooth inclined surfaces and arced inclined surfaces is shown in a large scale, a plurality of inclined surfaces and arced inclined surfaces forma an arced surface or a curved surface.

While the invent ion has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light emitting module, comprising:
    at least one light source;
    at least one reflector in which the light source is disposed having an inner surface serving as a reflecting surface;
    a hollow frame having an end disposed on a bottom of the reflector;
    a lens disposed on another end of the hollow frame and comprising a transparent plate comprising two planes and a positioning structure on a periphery thereof and a convex arced surface serving as a light exiting surface and at least one inclined surface disposed on the transparent plate, one of the planes defining a top portion on which the convex arced surface is disposed, and the other of the planes defining a bottom portion serving as a light incident surface, wherein at least one vertical center line and a transversely extending line are defined on the lens, the inclined surface is located on the bottom portion and located on one side of and engaging the vertical center line and located on one side of the transversely extending line, the inclined surface refracts light at an angle different from an angle at which the planes refract light, and the lens refracts light reflected by the reflector.

2. The light emitting module as claimed in claim 1, wherein the vertical center line comprises a first vertical center line on the bottom portion and a second vertical center line positioned in front of or behind the first vertical center line; the transversely extending line comprises a first transversely extending line on the bottom portion and a second transversely extending line in front of, behind, above or under the first transversely extending line.

3. The light emitting module as claimed in claim 2, wherein the lens comprises at least two convex arced surfaces, one of the convex arced surfaces has a radius different form a radius of the other of the convex arced surfaces.

4. The light emitting module as claimed in claim 1, wherein the lens further comprises an inclined surface disposed on the bottom portion and located on one side of the vertical center line and under the transversely extending line; the inclined surface is a smooth inclined surface, extends from a top located on the transversely extending line to the bottom portion, and the closer a position on the inclined surface is located to the bottom portion, and the further the position is the away from the top portion.

5. The light emitting module as claimed in claim 1, wherein the lens further comprises a plurality of inclined surfaces connected to each other and disposed on the bottom portion and located on one side of the vertical center line and under the transversely extending line, each of the inclined surfaces is a smooth inclined surface and has an inclined angle different the inclined angles of others of the inclined surfaces, and the closer the inclined surface is located to the bottom portion, the further the inclined surface is away from the top portion.

6. The light emitting module as claimed in claim 1, wherein the lens further comprises an inclined surface disposed on the bottom portion and located on one side of the vertical center line and under the transversely extending line; the inclined surface is a smooth inclined surface and extends from a top located on the transversely extending line to the bottom portion, and the closer a position on the inclined surface is located to the bottom portion, the closer is the position located to the top portion.

7. The light emitting module as claimed in claim 1, wherein the lens further comprises a plurality of inclined surfaces connected to each other and disposed on the bottom portion and located on one side of the vertical center line and under the transversely extending line, each of the inclined surfaces is a smooth inclined surface and has an inclined angle different the inclined angles of others of the inclined surfaces, and the closer the inclined surface is located to the bottom portion, the closer the inclined surface is located to the top portion.

8. The light emitting module as claimed in claim 1, wherein the lens further comprises an inclined surface disposed on the bottom portion and located on one side of the vertical center line and under the transversely extending line; the inclined surface is a smooth inclined surface, has a lateral side located on the vertical center line and extends from the lateral side toward another lateral side, and the closer a position on the inclined surface is located to the another lateral side, the closer the position is located to the top portion.

9. The light emitting module as claimed in claim 1, wherein the lens further comprises an inclined surface disposed on the bottom portion and located on one side of the vertical center line and under the transversely extending line; the inclined surface is a smooth inclined surface, has a lateral side located on the vertical center line and extends from the lateral side toward another lateral side, and the closer the inclined surface is located to the another lateral side, the closer the position is located to the top portion.

10. The light emitting module as claimed in claim 1, wherein the lens further comprises an inclined surface disposed on the bottom portion and located on one side of the vertical center line and under the transversely extending line; the inclined surface is a smooth inclined surface and comprises a top located on the transversely extending line and a lateral side located on the vertical center line, the inclined surface has two inclined directions, one of the inclined direction is from the top to the bottom portion, and the other of the inclined directions is from the lateral side to another lateral side of the inclined surface, the closer a position on the inclined surface is located to the bottom portion, the further the position is away from the top portion, and the closer a position on the inclined surface is located to the another lateral side, the closer the position is located to the top portion.

11. The light emitting module as claimed in claim 1, wherein the lens further comprises at least two inclined surfaces which are arced inclined surfaces disposed on the bottom portion and under the transversely extending line; one of the arced inclined surfaces extends from a semi-circular arc located on a lower half portion of the bottom portion to a transition line and gradually towards the top portion, and the other of the arced inclined surfaces extends from the transition line away from the top portion.

12. The light emitting module as claimed in claim 1, wherein the lens further comprises at least two inclined surfaces which are arced inclined surfaces disposed on the bottom portion and under the transversely extending line; one of the arced inclined surfaces extends from an intersecting point of the vertical center line and a transversely extending line to a transition line and gradually towards the top portion, and the other of the arced inclined surfaces extends from the transition line away from the top portion.

13. The light emitting module as claimed in claim 1, wherein the lens further comprises at least four inclined surfaces which are arced inclined surfaces disposed on the bottom portion and under the transversely extending line;

one of the arced inclined surfaces extends from an intersecting point of the vertical center line and a transversely extending line to a transition line and gradually towards the top portion, and another of the arced inclined surfaces extends from the transition line away from the top portion; another of the arced inclined surfaces extends from a point on the vertical center line and above the intersecting point to another transition line and gradually towards the top portion, and another of the arced inclined surfaces extends from the transition line away from the top portion.

14. The light emitting module as claimed in claim 1, wherein the lens further comprises two curved surfaces and two arced inclined surfaces disposed on the bottom portion and under the transversely extending line, and each of the curved surface comprises a plurality of arced inclined surfaces connected to each other and each of the arced inclined surfaces has an inclined angle different from the inclined angle of other arced inclined surfaces; each of the curved surface extends from an intersecting point of the vertical center line and the transversely extending line to a transition line and gradually towards the top portion; each of the arced inclined surface extends from the transition line away from the top portion.

15. The light emitting module as claimed in claim 1, wherein the lens further comprises two curved surfaces and two arced inclined surfaces disposed on the bottom portion and under the transversely extending line, and each of the curved surface comprises a plurality of arced inclined surfaces connected to each other and each of the arced inclined surfaces has an inclined angle different from the inclined angle of other arced inclined surfaces; one of the curved surfaces extends from an intersecting point of the vertical center line and the transversely extending line to a transition line and gradually towards the top portion, one of the arced inclined surface extends from the transition line away from the top portion; the other of the curved surfaces extends from a point on the vertical center line to another transition line and gradually towards the top portion, and the other of the arced inclined surface extends from the another transition line away from the top portion.

16. The light emitting module as claimed in claim 1, wherein the lens further comprises a curved surface and an arced inclined surfaces disposed on the bottom portion and under the transversely extending line, and each of the curved surface comprises a plurality of arced inclined surfaces connected to each other and each of the arced inclined surfaces has an inclined angle different from the inclined angle of other arced inclined surfaces; the curved surface extends from an intersecting point of the vertical center line and the transversely extending line to a transition line and gradually towards the top portion, and the arced inclined surface extends from the transition line away from the top portion.

17. The light emitting module as claimed in claim 1, wherein the lens further comprises at least two inclined surfaces which are arced inclined surfaces disposed on the bottom portion and above the transversely extending line; one of the arced inclined surfaces extends from an intersecting point of the vertical center line and a transversely extending line to a transition line and gradually towards the top portion, and the other of the arced inclined surfaces extends from the transition line away from the top portion.

18. The light emitting module as claimed in claim 1, wherein the lens further comprises at least four inclined surfaces which are arced inclined surfaces disposed on the bottom portion and above the transversely extending line; one of the arced inclined surfaces extends from an intersecting point of the vertical center line and a transversely extending line to a transition line and gradually towards the top portion, and another of the arced inclined surfaces extends from the transition line away from the top portion; another of the arced inclined surfaces extends from a point on the vertical center line and above the intersecting point to another transition line and gradually towards the top portion, and another of the arced inclined surfaces extends from the transition line away from the top portion.

19. The light emitting module as claimed in claim 1, wherein the lens further comprises two curved surfaces and two arced inclined surfaces disposed on the bottom portion and above the transversely extending line, and each of the curved surface comprises a plurality of arced inclined surfaces connected to each other and each of the arced inclined surfaces has an inclined angle different from the inclined angle of other arced inclined surfaces; each of the curved surface extends from an intersecting point of the vertical center line and the transversely extending line to a transition line and gradually towards the top portion; each of the arced inclined surface extends from the transition line away from the top portion.

20. The light emitting module as claimed in claim 1, wherein the lens further comprises two curved surfaces and two arced inclined surfaces disposed on the bottom portion and above the transversely extending line, and each of the curved surface comprises a plurality of arced inclined surfaces connected to each other and each of the arced inclined surfaces has an inclined angle different from the inclined angle of other arced inclined surfaces; one of the curved surfaces extends from an intersecting point of the vertical center line and the transversely extending line to a transition line and gradually towards the top portion, one of the arced inclined surface extends from the transition line away from the top portion; the other of the curved surfaces extends from a point on the vertical center line to another transition line and gradually towards the top portion, and the other of the arced inclined surface extends from the another transition line away from the top portion.

21. The light emitting module as claimed in claim 1, wherein the lens further comprises a curved surface and an arced inclined surfaces disposed on the bottom portion and under the transversely extending line, and each of the curved surface comprises a plurality of arced inclined surfaces connected to each other and each of the arced inclined surfaces has an inclined angle different from the inclined angle of other arced inclined surfaces; the curved surface extends from an intersecting point of the vertical center line and the transversely extending line to a transition line and gradually towards the top portion, and the arced inclined surface extends from the transition line away from the top portion.

22. The light emitting module as claimed in claim 1 further comprising at least one conical panel and at least one warning light emitting module.

23. The light emitting module as claimed in claim 1 further comprising at least one light shielding plate disposed on a bottom of the reflector.

24. The light emitting module as claimed in claim 1, wherein the hollow frame comprises at least one positioning structure and a light shielding plate disposed on the positioning structure and connected to at least one retractable rod of an electromagnet.

25. The light emitting module as claimed in claim 1, wherein the hollow frame comprises at least one positioning structure and a light grating movably disposed on the positioning structure and connected to at least one retractable rod of an electromagnet.

26. The light emitting module as claimed in claim 25, wherein the light grating comprises a transparent plate having a top surface and a bottom surface, at least one arced surface is formed on a central region of the bottom surface, and the arced surface has a highest point located on a position above a center of the bottom surface.

27. The light emitting module as claimed in claim 26, wherein the light grating further comprises at least one inclined surface disposed on one side of a vertical center line of the top surface, the inclined surface is a smooth inclined surface, the inclined surface extends from a top of the light grating to a bottom of the light grating and gradually towards the top portion.

28. The light emitting module as claimed in claim 25, wherein the light grating comprises a transparent plate having a top surface and a bottom surface, a plurality of inclined surfaces connected to each other are formed on a central region of the bottom surface, the closer the inclined surface is located to a bottom of the light grating, the more the inclined surface inclined towards the bottom surface.

29. The light emitting module as claimed in claim 28, wherein the light grating further comprises at least one inclined surface disposed on one side of a vertical center line of the top surface, the inclined surface is a smooth inclined surface, the inclined surface extends from a top of the light grating to a bottom of the light grating and gradually towards the top portion.

30. The light emitting module as claimed in claim 25, wherein the hollow frame further comprises at least another positioning structure and a light shielding plate movably disposed on the positioning structure; the light shielding plate has one side connected to one end of a first frame, another end of the first frame and one end of a second frame are joined to a movable shaft, the second frame has a central portion mounted to a movable shaft of another positioning structure disposed on the hollow frame, and another end of the second frame is connected to a movable shaft disposed on a retractable rod of an electromagnet.

* * * * *